(12) United States Patent
Noda

(10) Patent No.: US 7,864,357 B2
(45) Date of Patent: Jan. 4, 2011

(54) PRINT SYSTEM, INFORMATION PROCESSING APPARATUS, PRINTING APPARATUS, PRINTING METHOD, AND PROGRAM

(75) Inventor: Akihiko Noda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 574 days.

(21) Appl. No.: 11/858,725

(22) Filed: Sep. 20, 2007

(65) Prior Publication Data

US 2008/0007778 A1    Jan. 10, 2008

Related U.S. Application Data

(62) Division of application No. 10/131,400, filed on Apr. 25, 2002, now Pat. No. 7,292,360.

(30) Foreign Application Priority Data

Apr. 26, 2001   (JP) .............................. 2001-129719

(51) Int. Cl.
*G06F 3/12*      (2006.01)
*G06K 15/00*   (2006.01)

(52) U.S. Cl. ................... 358/1.15; 358/1.13; 358/1.18; 358/1.16; 358/1.17

(58) Field of Classification Search ................ 358/1.14, 358/1.15, 1.16, 1.1, 1.13, 1.18, 1.9, 1.2, 1.6, 358/1.11, 1.17, 407, 468; 399/1, 16, 80, 399/81, 82, 83; 705/26; 709/217, 218, 219; 347/2, 3, 5, 14, 23; 715/200, 274, 700; 710/8, 710/15, 62, 64, 72
See application file for complete search history.

(56) References Cited

U.S. PATENT DOCUMENTS

| 5,436,730 A | 7/1995 | Hube |
| 5,727,135 A | 3/1998 | Webb et al. |
| 5,978,477 A | 11/1999 | Hull et al. |

(Continued)

FOREIGN PATENT DOCUMENTS

EP    1 085 408 A2 *    3/2001

(Continued)

OTHER PUBLICATIONS

Kengo Inoue, DOS/V magazine, vol. 9, No. 6, Apr. 1, 2000, p. 258.

(Continued)

*Primary Examiner*—Doc Popovici
(74) *Attorney, Agent, or Firm*—Fitzpatrick, Cella, Harper & Scinto

(57) ABSTRACT

A print system which can improve searching performance and operability at the time of using boxes of a printing apparatus is provided. In a host, as a box dialog for designating the box serving as an input destination of a print job in accordance with the operation of the user, one of a box dialog including a list of box information regarding a plurality of boxes of a printer and a box dialog including a list of box information regarding the box used as an input destination of the print job is selected and displayed onto a display unit. The box serving as an input destination of the print job is designated on the displayed box dialog in accordance with the operation of the user.

7 Claims, 22 Drawing Sheets

U.S. PATENT DOCUMENTS

| | | |
|---|---|---|
| 6,535,294 B1 | 3/2003 | Arledge, Jr. et al. |
| 6,535,298 B2 | 3/2003 | Winter et al. |
| 6,559,967 B1 | 5/2003 | Akiba et al. |
| 6,894,792 B1 | 5/2005 | Abe |
| 7,058,696 B1 | 6/2006 | Phillips et al. |
| 2003/0016381 A1 | 1/2003 | Taniguchi |

FOREIGN PATENT DOCUMENTS

| | | |
|---|---|---|
| JP | 11-146115 | 5/1999 |

OTHER PUBLICATIONS

Office Action, dated Apr. 28, 2009, in JP 2001-129719.

* cited by examiner

FIG. 3
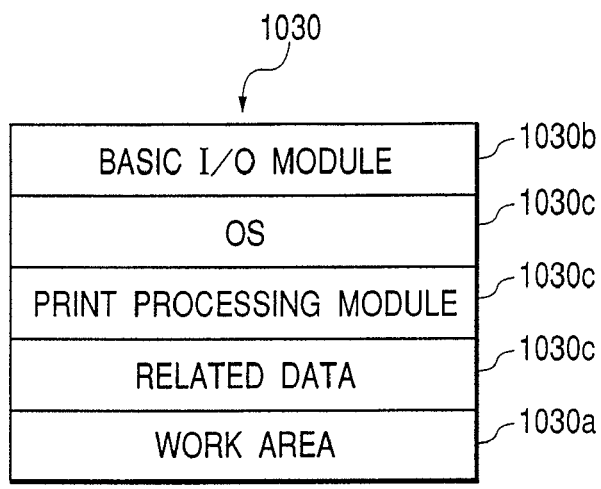
FIG. 4
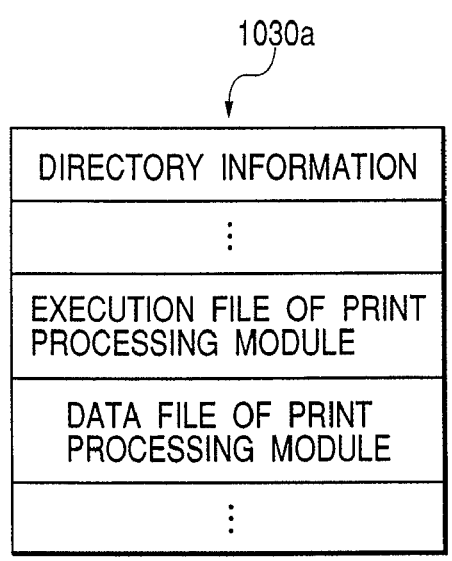
FIG. 5
BOX INFORMATION REFERENCE DESTINATION TABLE
| REFERENCE DESTINATION | SERVER : My-Server/00 : 11 : 22 : 33 : 44 |
|---|---|
| STORING LOCATION | ¥top¥data |
| TABLE NAME | Table.inf |
| ⋮ | ⋮ |

FIG. 13

PRINT FILE INFORMATION TABLE

| THE NO. OF COPIES | 1 |
|---|---|
| SIZE | A4 |
| JOB PROCESSING METHOD | STORE INTO BOX |
| BOX NO. | 72 |
| ⋮ | ⋮ |

FIG. 14

DISPLAYING METHOD MENU

| | |
|---|---|
| | DISPLAY EVERYTHING |
| ✓ | DISPLAY REGIDTERED ITEMS |
| | DISPLAY ITEMS USED BEFORE |

FIG. 15

REGISTRATION BOX INFORMATION TABLE

| No. | BOX NAME | REGISTERED APPLICATION | ⋮ |
|---|---|---|---|
| 3 | FOR KAZUYOSHI HOSHINO | Driver | ⋮ |
| 4 | FOR TETSU MOTOYAMA | Utility | ⋮ |
| 7 | FOR E. COMERSE | Utility | ⋮ |
| ⋮ | ⋮ | ⋮ | ⋮ |

FIG. 18

USE BOX INFORMATION TABLE

| No. | BOX NAME | REGISTERED APPLICATION | ⋮ |
|---|---|---|---|
| 1 | FOR MASAYOSHI KAGEYAMA | Driver | ⋮ |
| 3 | FOR KAZUYOSHI HOSHINO | Driver | ⋮ |
| 6 | FOR TOSHIKAZU WAKISAKA | Utility | ⋮ |
| ⋮ | ⋮ | ⋮ | ⋮ |

PRINT COMMAND INFORMATION TABLE

| BOX NO. | 91 |
|---|---|
| FILE | File-910.doc |
| PRINT END NOTIFICATION DESTINATION | Host-xyz |
| THE NUMBER OF COPIES | 10 |
| ⋮ | ⋮ |

| DISPLAYING METHOD MENU |
|---|
| DISPLAY EVERYTHING |
| DISPLAY ITEMS IN WHICH OWN JOB EXISTS |
| DISPLAY ITEMS IN WHICH JOB EXISTS |
| SORT ACCORDING TO TIME (PRIORITY IS GIVEN TO LATEST ITEM) |
| SORT ACCORDING TO SIZE (PRIORITY IS GIVEN TO LARGEST ITEM) |
| DISPLAY ITEMS IN WHICH ARBITRARY JOB EXISTS |
| DISPLAY ITEMS OF THE SAME DIVISION (GROUP ID) |
| DISPLAY ITEMS IN WHICH SECURITY IS OK |
| ⋮ |

PRINT SYSTEM, INFORMATION PROCESSING APPARATUS, PRINTING APPARATUS, PRINTING METHOD, AND PROGRAM

This application is a divisional application of application Ser. No. 10/131,400, now allowed, filed Apr. 25, 2002, which is incorporated herein by reference.

BACKGROUND OF THE INVENTION

1. Field of the Invention

The invention relates to a print system which can input print jobs to a plurality of boxes of a printing apparatus and designate the print job to be processed from the print jobs inputted to the plurality of boxes by an information processing apparatus. The invention also relates to the information processing apparatus, the printing apparatus, a printing method, and a program which are used for such a print system.

2. Related Background Art

Hitherto, a box printing function is utilized in an information processing system having a host computer (hereinafter, referred to as a host) and a printer connected thereto.

According to the box printing function, the user forms print data in the host by using a printer driver or the like, and the print data is outputted (stored) into a storing device called a box provided in the printer. There can be a plurality of boxes and they are allocated for a personal use, a division use, and the like according to an application and an operation and used. For example, the user can activate the printer driver on the host and store a print job into the box allocated for the personal use (himself). Assuming that the print jobs with file names "File-12.doc", "result.doc", and "File-18.doc" exist in the box, the user can select a desired print job from the print jobs stored in the box and print an image onto paper by an instruction from a panel of the printer, an instruction from a utility of the host, or the like at arbitrary timing.

The box printing function effects remarkable convenience and high working efficiency. For example, by selecting a plurality of stored print data (jobs) in a lump, the user can output them in a lump. It is unnecessary that the user goes to the printer to pick up output matter each time the job is outputted. If the printer is shared with a plurality of users, a mixture of the output matter and output matter of other users can be avoided. The stored job can be used again at a high speed.

In the foregoing box printing function, in case of inputting the print jobs from the driver to the boxes and in case of executing the jobs in the boxes from the utility, it is necessary to search a desired box and designate the box or the print job inputted thereto. However, many boxes (for example, 100 boxes) have been set into the printer, and in a dialog to display a list of the boxes, all of the boxes cannot be simultaneously displayed. Therefore, it is necessary to repetitively execute a scrolling operation in order to search a desired box and designate it, so that searching performance is low. For example, when the boxes are sorted in order of the numbers allocated thereto, in case of reusing the box with the box No. 88 among the 100 boxes, it is necessary to execute the scrolling operation several times.

If box information which is used is insufficient or lacks, the searching performance deteriorates further. For example, there is a case where the user has lost his memory of the box information used before, or the like. As for timing when the job in the box is executed from the utility, the job is often reused after the elapse of a predetermined time after the job was inputted from the driver into the box. There is, consequently, a tendency such that the memory of the box information is easily lost. Particularly, for example, in the case where the box number has been allocated as box information but a box name is not set, the searching operation only according to the box number is executed, so that the searching performance deteriorates. Therefore, the user has to consciously record the information of the box onto paper or the like each time the box is used in consideration of use of the next time.

Further, in a situation such that one user uses a plurality of hosts or in an environment where the host to be used is not specified, it is necessary to carry the stored information, and use efficiency is low.

SUMMARY OF THE INVENTION

It is an object of the invention to provide a print system, an information processing apparatus, a printing apparatus, a printing method, and a program, in which searching performance and operability in case of using boxes of the printing apparatus can be improved.

According to the invention, there is provided a print system which has a printing apparatus having a plurality of boxes to which print jobs can be inputted and an information processing apparatus having display means and in which the print jobs can be inputted respectively to the plurality of boxes and the print job to be processed can be designated from the print jobs inputted respectively to the plurality of boxes by the information processing apparatus, comprising: box designation picture plane display means for displaying a box designation picture plane for designating the box serving as an input destination of the print job onto the display means of the information processing apparatus; print job input destination box designating means for designating the box serving as an input destination of the print job on the box designation picture plane displayed by the display means in accordance with a box designating operation of the user; and box registering means for designating the box to be registered on the box designation picture plane displayed by the display means in accordance with a registration designating operation of the user and storing box information regarding the designated box into registration box information storing means, wherein the box designation picture plane display means can obtain the box information regarding the registered box from the registration box information storing means and display a list of only the box information regarding the registered boxes onto the box designation picture plane.

According to the invention, there is provided a print system which has a printing apparatus having a plurality of boxes to which print jobs can be inputted and an information processing apparatus having display means and in which the print jobs can be inputted respectively to the plurality of boxes and the print job to be processed can be designated from the print jobs inputted respectively to the plurality of boxes by the information processing apparatus, comprising: print job designation picture plane display means for displaying a print job designation picture plane for designating the print job to be processed from the print jobs inputted respectively to the plurality of boxes onto the display means of the information processing apparatus; print job designating means for designating the print job to be processed on the print job designation picture plane displayed by the display means in accordance with a print job designating operation of the user; and box registering means for designating the box to be registered on the print job designation picture plane displayed by the display means in accordance with a registration designating operation of the user and storing print job information regarding the designated box and the print job inputted thereto into registration box information storing means, wherein the print job designation picture plane display means can obtain the print job information regarding the print job inputted to the registered box from the registration box information storing means and display a list of only the print job information of the registered boxes onto the print job designation picture plane.

According to the invention, there is provided an information processing apparatus that can respectively input print jobs into a plurality of boxes which are provided for a printing apparatus and to which the print jobs can be inputted and that can designate the print job to be processed from the print jobs inputted respectively to the plurality of boxes, comprising: display means for displaying various information; box designation picture plane display means for displaying a box designation picture plane for designating a box serving as an input destination of the print job onto the display means; print job input destination box designating means for designating the box serving as an input destination of the print job on the box designation picture plane displayed by the display means in accordance with a box designating operation of the user; and box registering means for designating the box to be registered on the box designation picture plane displayed by the display means in accordance with a registration designating operation of the user and storing box information regarding the designated box into registration box information storing means, wherein the box designation picture plane display means can obtain the box information regarding the registered box from the registration box information storing means and display a list of only the box information regarding the registered boxes onto the box designation picture plane.

According to the invention, there is provided an information processing apparatus that can respectively input print jobs into a plurality of boxes which are provided for a printing apparatus and to which the print jobs can be inputted and that can designate the print job to be processed from the print jobs inputted respectively to the plurality of boxes, comprising: display means for displaying various information; print job designation picture plane display means for displaying a print job designation picture plane for designating the print job to be processed from the print jobs inputted respectively to the plurality of boxes onto the display means; print job designating means for designating the print job to be processed on the print job designation picture plane displayed by the display means in accordance with a print job designating operation of the user; and box registering means for designating the box to be registered on the print job designation picture plane displayed by the display means in accordance with a registration designating operation of the user and storing print job information regarding the designated box and the print job inputted thereto into registration box information storing means, wherein the print job designation picture plane display means can obtain the print job information regarding the print job inputted to the registered box from the registration box information storing means and display a list of only the print job information of the registered boxes onto the print job designation picture plane.

According to the invention, there is provided a printing apparatus that has a plurality of boxes to which print jobs can be inputted from an information processing apparatus and that can process the print jobs inputted respectively to the plurality of boxes, comprising: print job storing means for, when the print job added with box information which can specify the box on an input destination side is received from the information processing apparatus, specifying the box serving as an input destination of the received print job on the basis of the box information and storing the received print job into the specified box; processing means for, when print command information which can specify the print job and the box of the input destination of such a print job is received from the information processing apparatus, reading out the corresponding print job from the corresponding box on the basis of the received print command information and processing the read-out print job; and transmitting means for, when an information obtaining request is received from the information processing apparatus, transmitting information according to the information obtaining request to the information processing apparatus.

According to the invention, there is provided a printing method which can respectively input print jobs from an information processing apparatus having display means to a plurality of boxes provided for a printing apparatus and designate the print job to be processed from the print jobs inputted respectively to the plurality of boxes, comprising the steps of: displaying a box designation picture plane for designating the box serving as an input destination of the print job onto the display means of the information processing apparatus; designating the box serving as an input destination of the print job on the box designation picture plane displayed by the display means in accordance with a box designating operation of the user; designating the box to be registered on the box designation picture plane displayed by the display means in accordance with a registration designating operation of the user and storing box information regarding the designated box into registration box information storing means; and obtaining the box information regarding the registered box from the registration box information storing means and displaying a list of only the box information regarding the registered boxes onto the box designation picture plane.

According to the invention, there is provided a printing method which can respectively input print jobs from an information processing apparatus having display means to a plurality of boxes provided for a printing apparatus and designate the print job to be processed from the print jobs inputted respectively to the plurality of boxes, comprising the steps of: displaying a print job designation picture plane for designating the print job to be processed from the print jobs inputted respectively to the plurality of boxes onto the display means of the information processing apparatus; designating the print job to be processed on the print job designation picture plane displayed by the display means in accordance with a print job designating operation of the user; designating the box to be registered on the print job designation picture plane displayed by the display means in accordance with a registration designating operation of the user and storing print job information regarding the designated box and the print job inputted thereto into registration box information storing means; and obtaining the print job information regarding the print job inputted to the registered box from the registration box information storing means and displaying a list of only the print job information of the registered boxes onto the print job designation picture plane.

According to the invention, there is provided a program which can be executed by an information processing apparatus for respectively inputting print jobs into a plurality of boxes provided for a printing apparatus, comprising: a box designation picture plane display module for displaying a box designation picture plane for designating the box serving as an input destination of the print job onto display means; a print job input destination box designating module for designating the box serving as an input destination of the print job on the box designation picture plane displayed by the display means in accordance with a box designating operation of the user; and a box registering module for designating the box to be registered on the box designation picture plane displayed by the display means in accordance with a registration designating operation of the user and storing box information regarding the designated box into registration box information storing means, wherein the box designation picture plane display module can obtain the box information regarding the registered box from the registration box information storing means and display a list of only the box information regarding the registered boxes onto the box designation picture plane.

According to the invention, there is provided a program which can be executed by an information processing apparatus for designating a print job to be processed from print jobs which have been inputted respectively into a plurality of boxes provided for a printing apparatus, comprising: a print job designation picture plane display module for displaying a print job designation picture plane for designating the print job to be processed from the print jobs inputted respectively to the plurality of boxes onto display means; a print job designating module for designating the print job to be processed on the print job designation picture plane displayed by the display means in accordance with a print job designating operation of the user; and a box registering module for designating the box to be registered on the print job designation picture plane displayed by the display means in accordance with a registration designating operation of the user and storing print job information regarding the designated box and the print job inputted thereto into registration box information storing means, wherein the print job designation picture plane display module can obtain the print job information regarding the print job inputted to the registered box from the registration box information storing means and display a list of only the print job information of the registered boxes onto the print job designation picture plane.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram showing a memory map in a storing unit in a host in FIG. 2;

FIG. 4 is a diagram showing a memory map in an RAM in the storing unit in the host in FIG. 2;

FIG. 5 is a diagram showing an example of a data structure of a box information reference destination table stored in a disk device in the storing unit in the host in FIG. 2;

FIG. 13 is a diagram showing an example of a print file information table which is stored in step S2007 in FIG. 8;

FIG. 14 is a diagram showing a displaying method menu showing a list of displaying methods which can be set to a box dialog;

FIG. 15 is a diagram showing an example of a registration box information table which is held in the server in FIG. 1;

FIG. 18 is a diagram showing an example of the use box information table which is held in the server in FIG. 1;

DETAILED DESCRIPTION OF THE PREFERRED EMBODIMENT

An embodiment of the invention will be described hereinbelow with reference to the drawings.

Figure 1:
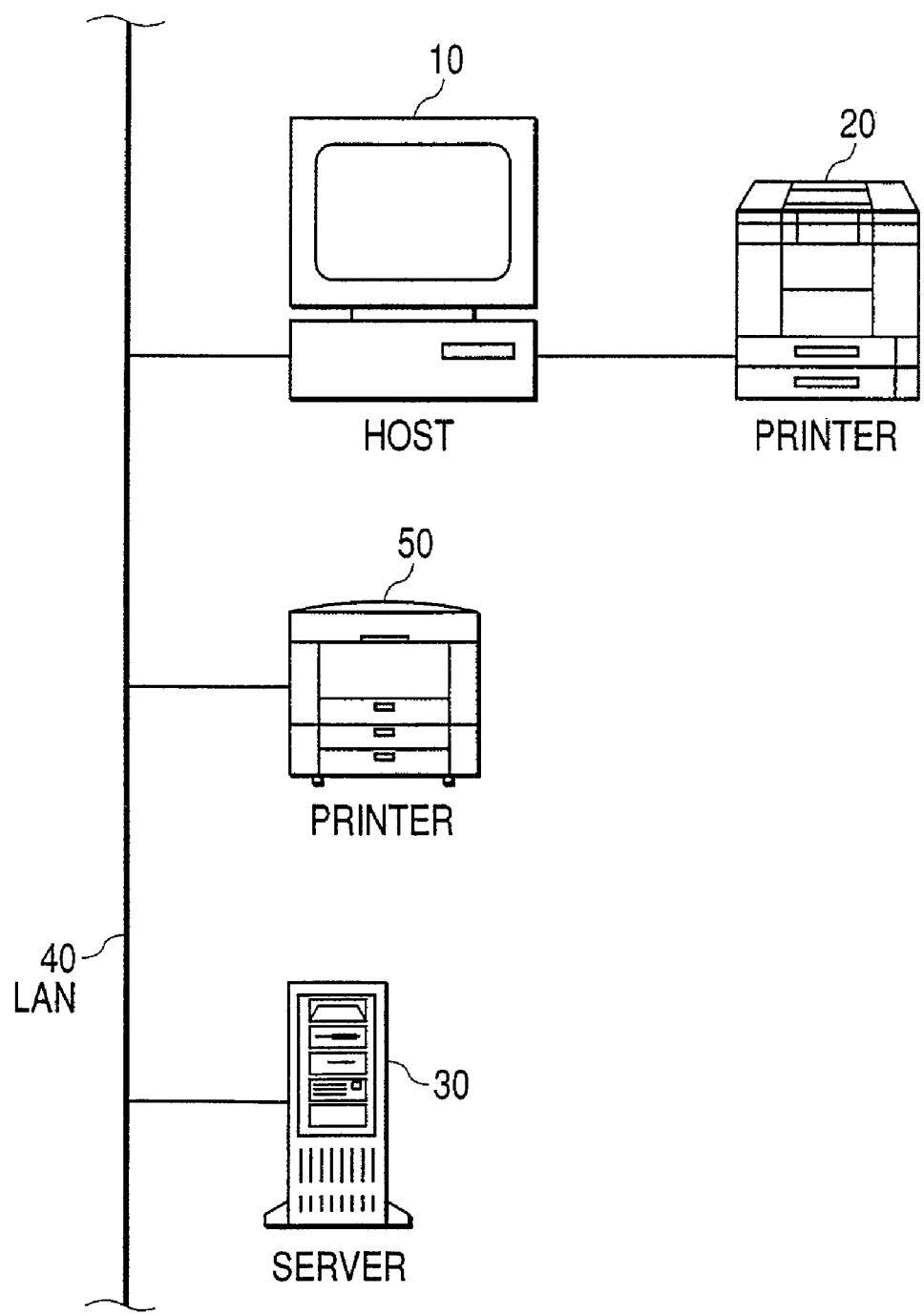
FIG. 1 is a diagram schematically showing a construction of a print system according to an embodiment of the invention.
Figure 2:
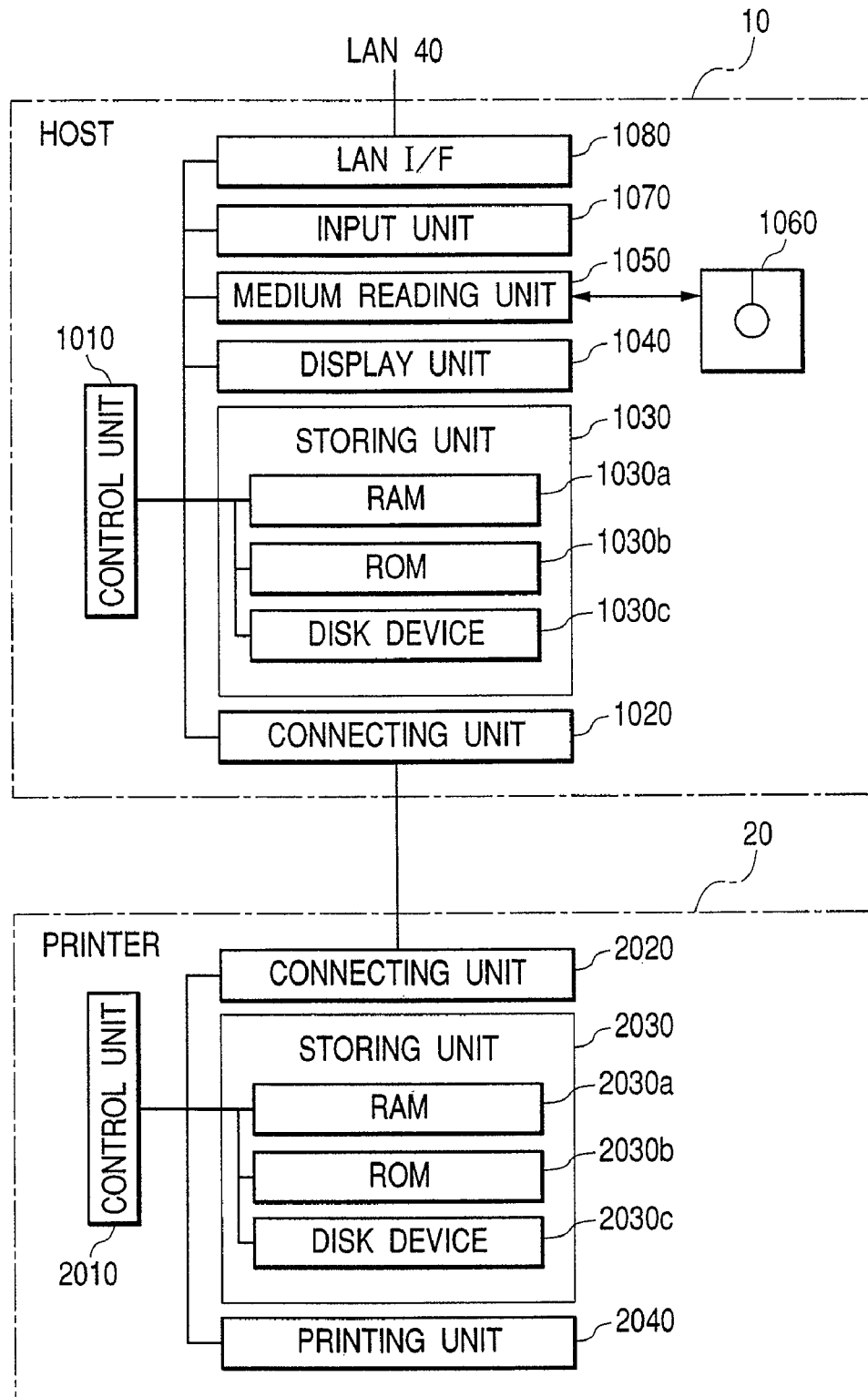
FIG. 2 is a block diagram showing a functional construction in the print system of FIG. 1.
Figure 6:
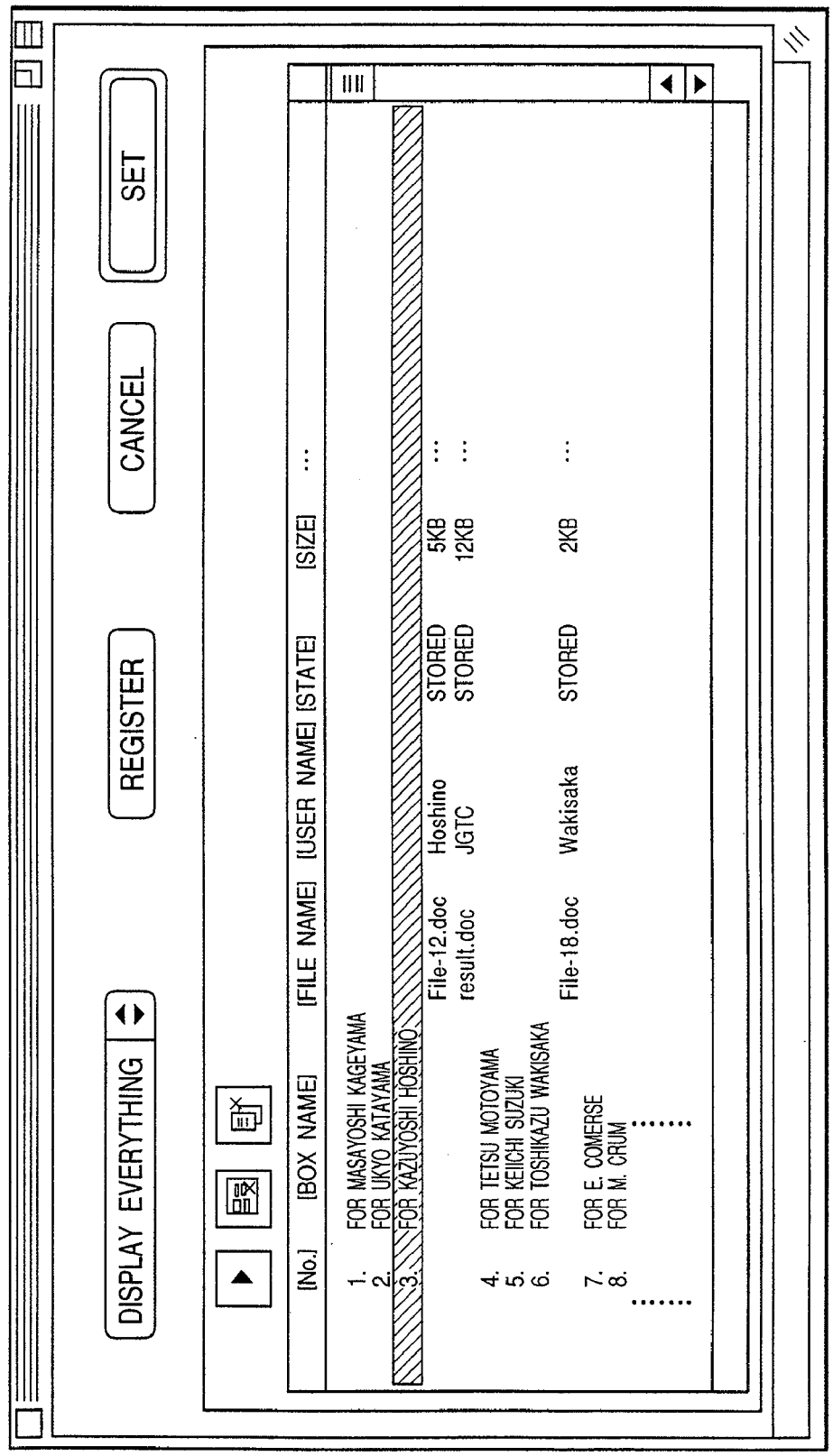
FIG. 6 is a diagram showing an example of a print dialog which is opened by a printer driver that is activated on the host in FIG. 2.
Figure 7:
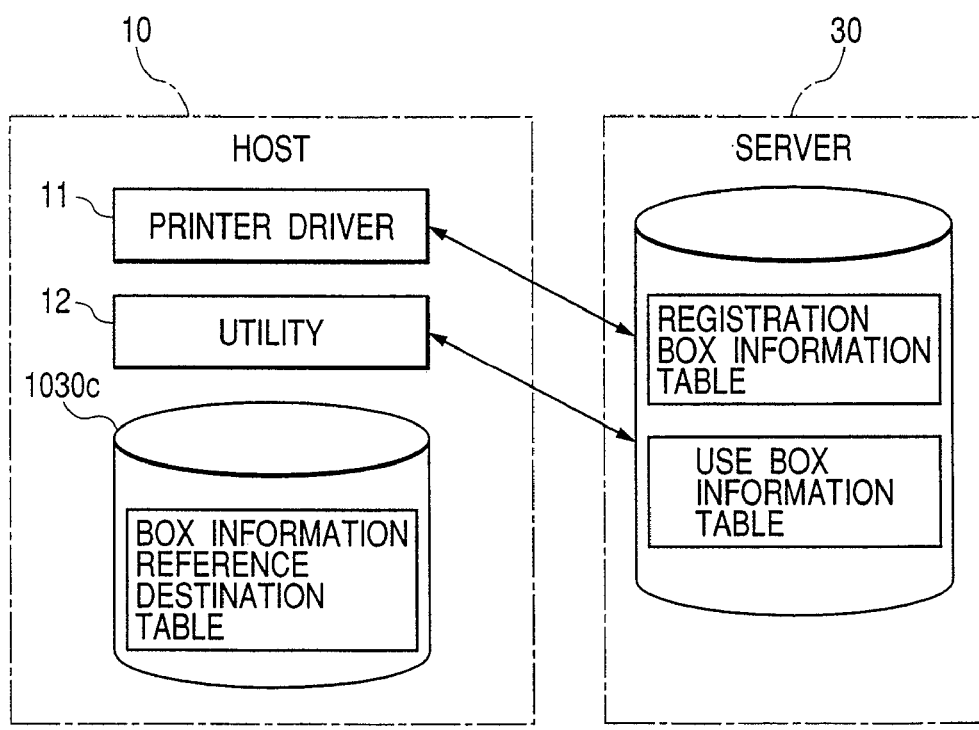
FIG. 7 is a diagram schematically showing a holding state of a registration box information table and a use box information table by a server in FIG. 1.

FIG. 1 is a diagram schematically showing a construction of a print system according to the embodiment of the invention. FIG. 2 is a block diagram showing a functional construction in the print system of FIG. 1. FIG. 3 is a diagram showing a memory map in a storing unit in a host in FIG. 2. FIG. 4 is a diagram showing a memory map in an RAM in the storing unit in the host in FIG. 2. FIG. 5 is a diagram showing an example of a data structure of a box information reference destination table stored in a disk device in the storing unit in the host in FIG. 2. FIG. 6 is a diagram showing an example of a print dialog which is opened by a printer driver that is activated on the host in FIG. 2. FIG. 7 is a diagram schematically showing a holding state of a registration box information table and a use box information table by a server in FIG. 1.

As shown in FIG. 1, the print system has: a host computer (hereinafter, referred to as a host) 10 comprising a personal computer, a workstation, or the like; a printer 20 connected to the host 10; and a server 30 connected to the host 10 via an LAN (Local Area Network) 40. A printer 50 having a network function is connected to the LAN 40.

As shown in FIG. 2, the host 10 has: a control unit 1010 including a CPU; a connecting unit 1020 as an interface for connecting to the printer 20; a storing unit 1030 for storing an OS program and various applications; a display unit 1040 for displaying various information; a medium reading unit 1050 for reading out a portable memory medium 1060 such as floppy (registered trademark) disk, CD-ROM, memory card, or the like; an input unit 1070 including a keyboard, a mouse, and the like; and an LAN I/F (interface) 1080 for connecting to the LAN 40.

The storing unit 1030 includes: an RAM 1030a; an ROM 1030b; and a disk device 1030c comprising a hard disk drive or the like. As shown in FIG. 3, in the storing unit 1030, a basic I/O module (BIOS) has been stored in the ROM 1030b. The OS (Operating System) program, a print processing module, related data, and the like have been stored in the disk device 1030c, respectively. The RAM 1030a provides a work area which is used when the control unit 1010 executes a process.

The control unit 1010 constructs the OS by executing the OS program in the disk device 1030c in accordance with the BIOS stored in the ROM 1030b in the storing unit 1030 and executes various applications on the OS. A printer driver and a utility are included in the various applications. By activating them, each process shown in flowcharts, which will be explained hereinlater, can be executed.

The various applications can be also read out from the portable memory medium 1060 and loaded by the medium reading unit 1050. Those various applications are loaded into the RAM 1030a from the disk device 1030c or portable memory medium 1060 and executed on the OS. For example, upon execution of a printing process, as shown in FIG. 4, directory information, an execution file of a print processing module, a data file, and the like are loaded into the RAM 1030a and the printing process can be executed.

A box information reference destination table for showing existing destinations of a registration box information table and a use box information table has been stored in the disk device 1030c. For example, as shown in FIG. 5, an address of a server in which the registration box information table and the use box information table have been stored, a storing destination of the box information in the server, and names of the registration box information table and the use box information table have been described in the box information reference destination table. As shown in FIG. 7, it is assumed that the registration box information table and the use box information table have been stored in the server 30. A driver 11 or a utility 12 of the host 10 can access each of the registration box information table and the use box information table with reference to the box information reference destination table. Details of the registration box information table and the use box information table will be explained hereinlater.

As shown in FIG. 2, the printer 20 has: a control unit 201 including a CPU for controlling the whole apparatus; a connecting unit 2020 as an. interface for connecting to the host 10; a storing unit 2030; and a printing unit 2040 for printing an image onto paper. The storing unit 2030 includes an RAM 2030a, an ROM 2030b, and a disk device 2030c. A control program for controlling the whole printer 20 has been stored in the ROM 2030b in the storing unit 2030. A plurality of boxes for a box printing function have been provided for the disk device 2030c. The RAM 2030a provides a work area which is used when the control unit 2010 executes processes. The control unit 2010 executes various controls in accordance with the control program stored in the ROM 2030b in the storing unit 2030. Thus, processes shown in flowcharts, which will be explained hereinlater, can be executed.

For example, as shown in FIG. 6, a box number and a box name can be added to each of a plurality of boxes provided for the disk device 2030c in the storing unit 2030 and each print job is stored therein. In the print job, a file name, a user name, a state, a size, and the like are included as information showing a property of the print job.

Figure 8:
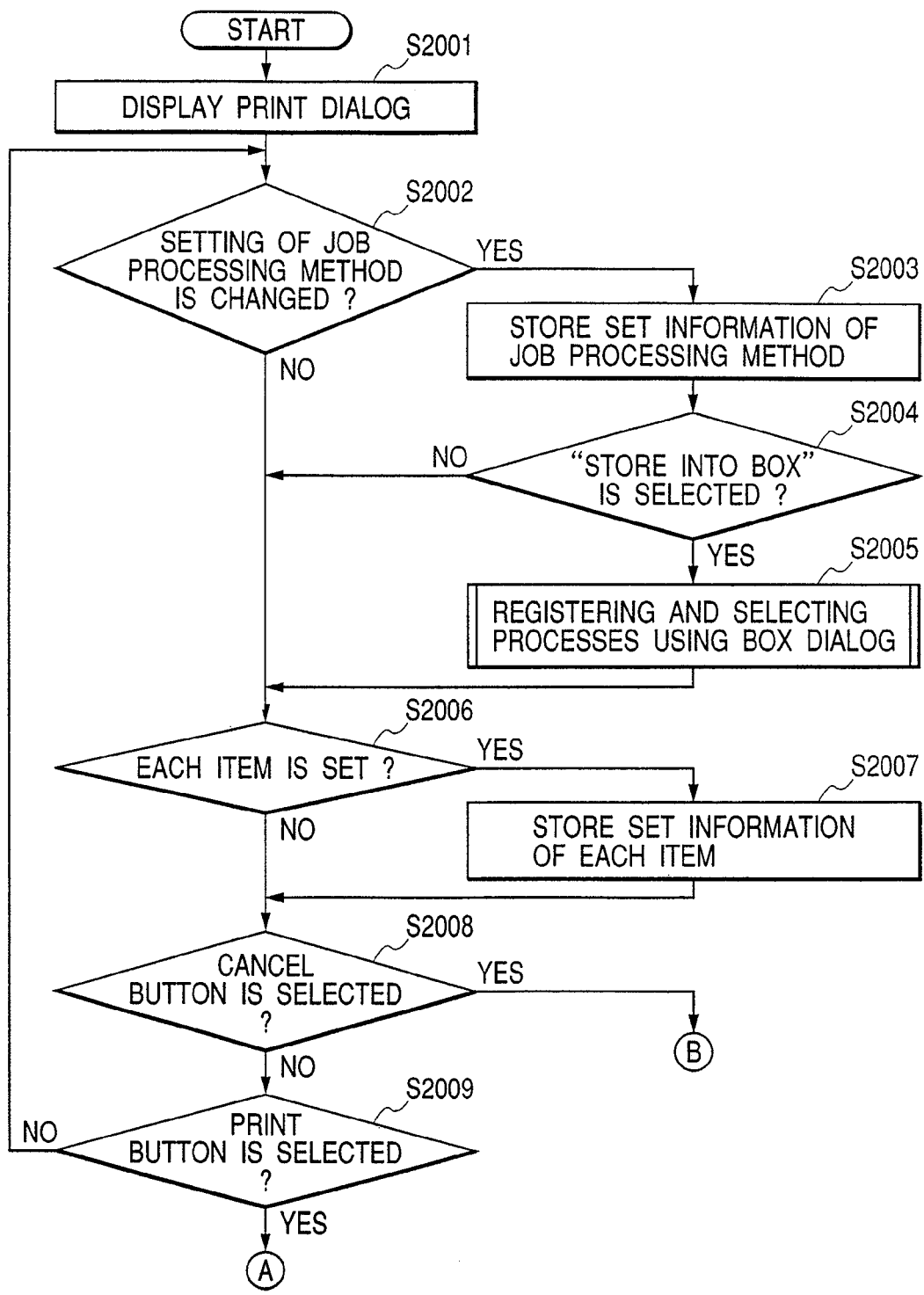
FIG. 8 is a flowchart showing a procedure for a printing process which is executed by the printer driver that is activated on the host in FIG. 2.
Figure 9:
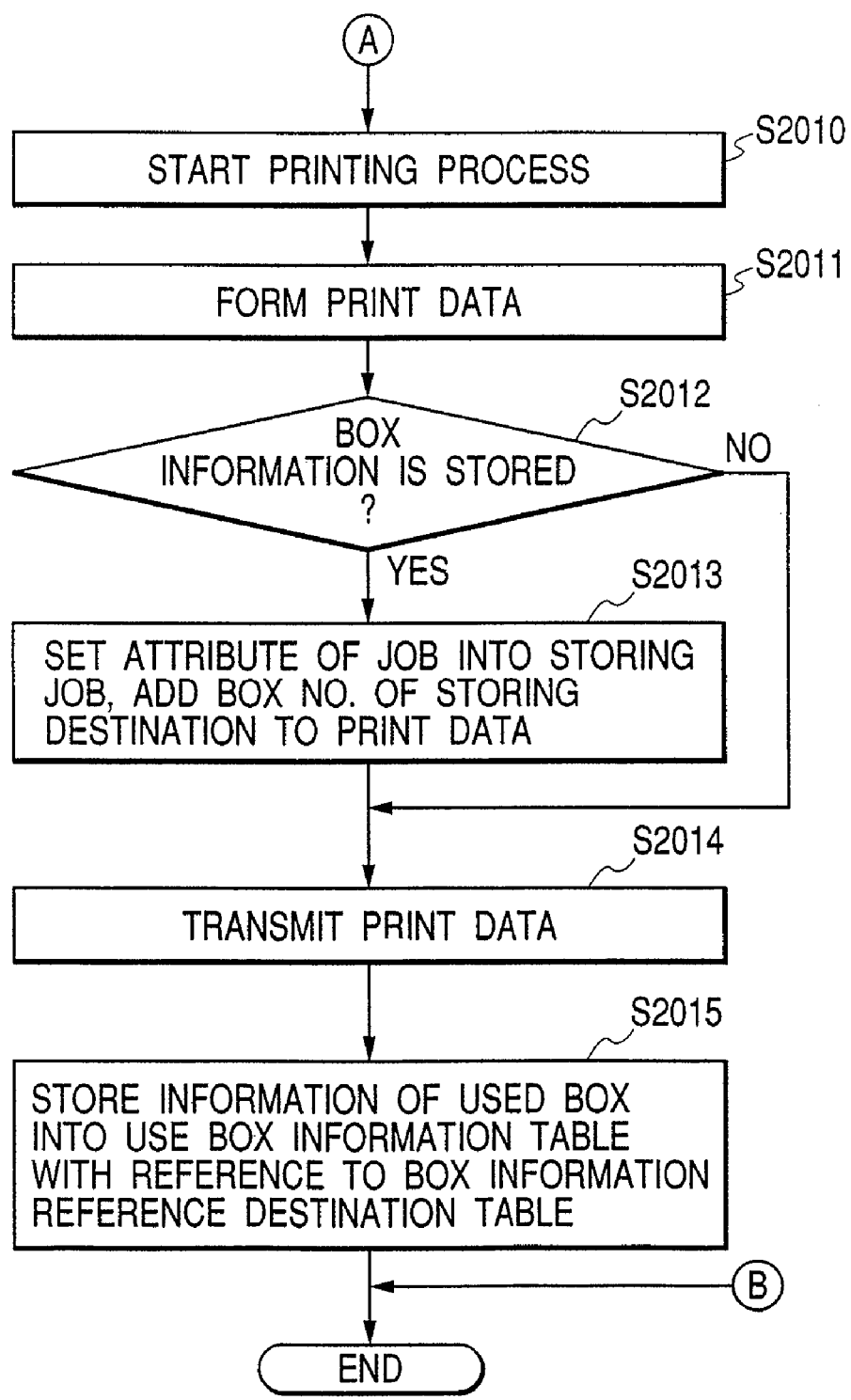
FIG. 9 is a flowchart showing the procedure for the printing process which is executed by the printer driver that is activated on the host in FIG. 2.
Figure 10:
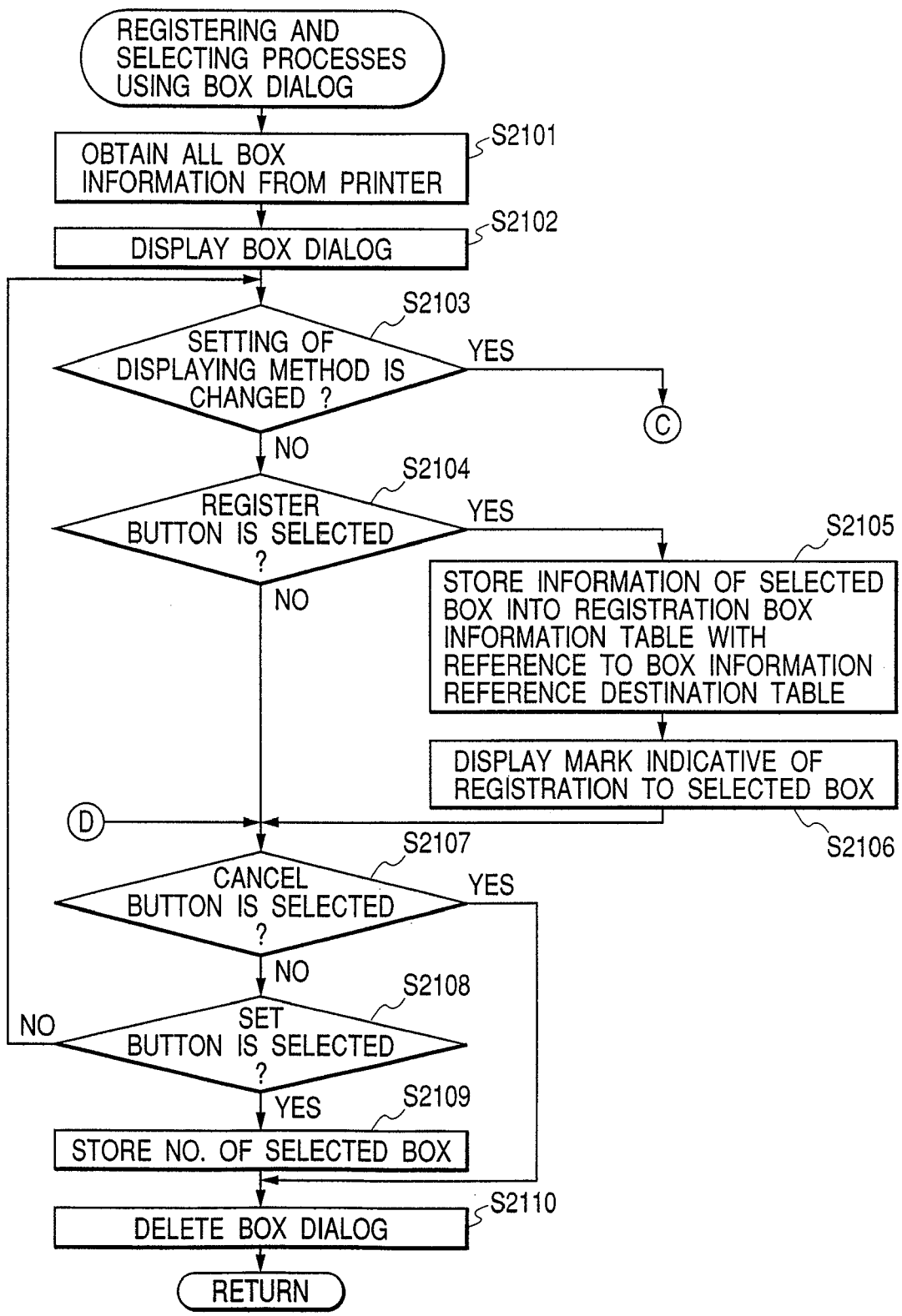
FIG. 10 is a flowchart showing details of a process in step S2005 in FIG. 8.
Figure 11:
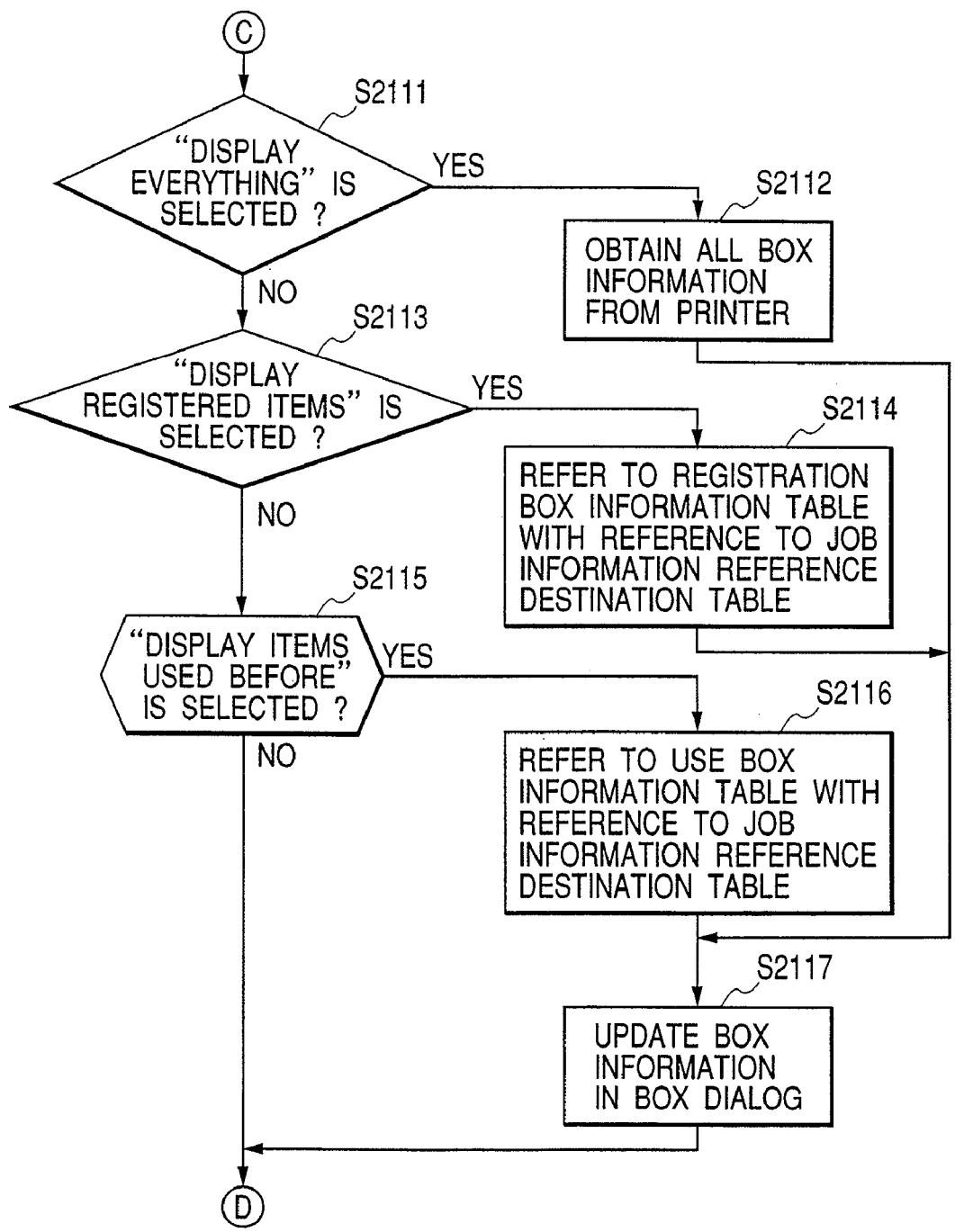
FIG. 11 is a flowchart showing details of the process in step S2005 in FIG. 8.
Figure 12:
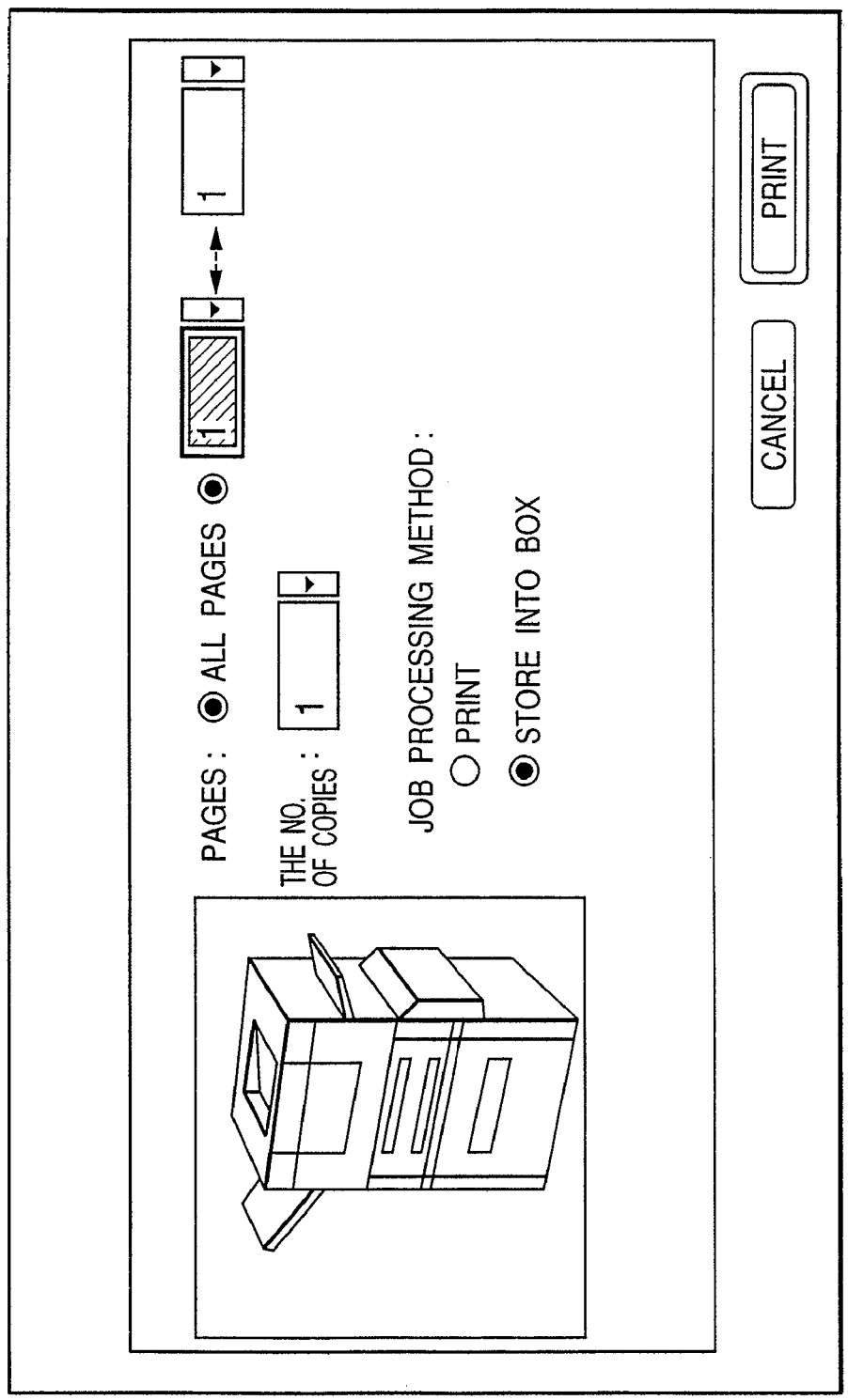
FIG. 12 is a diagram showing an example of a print dialog which is displayed by in step S2001 in FIG. 8.
Figure 16:
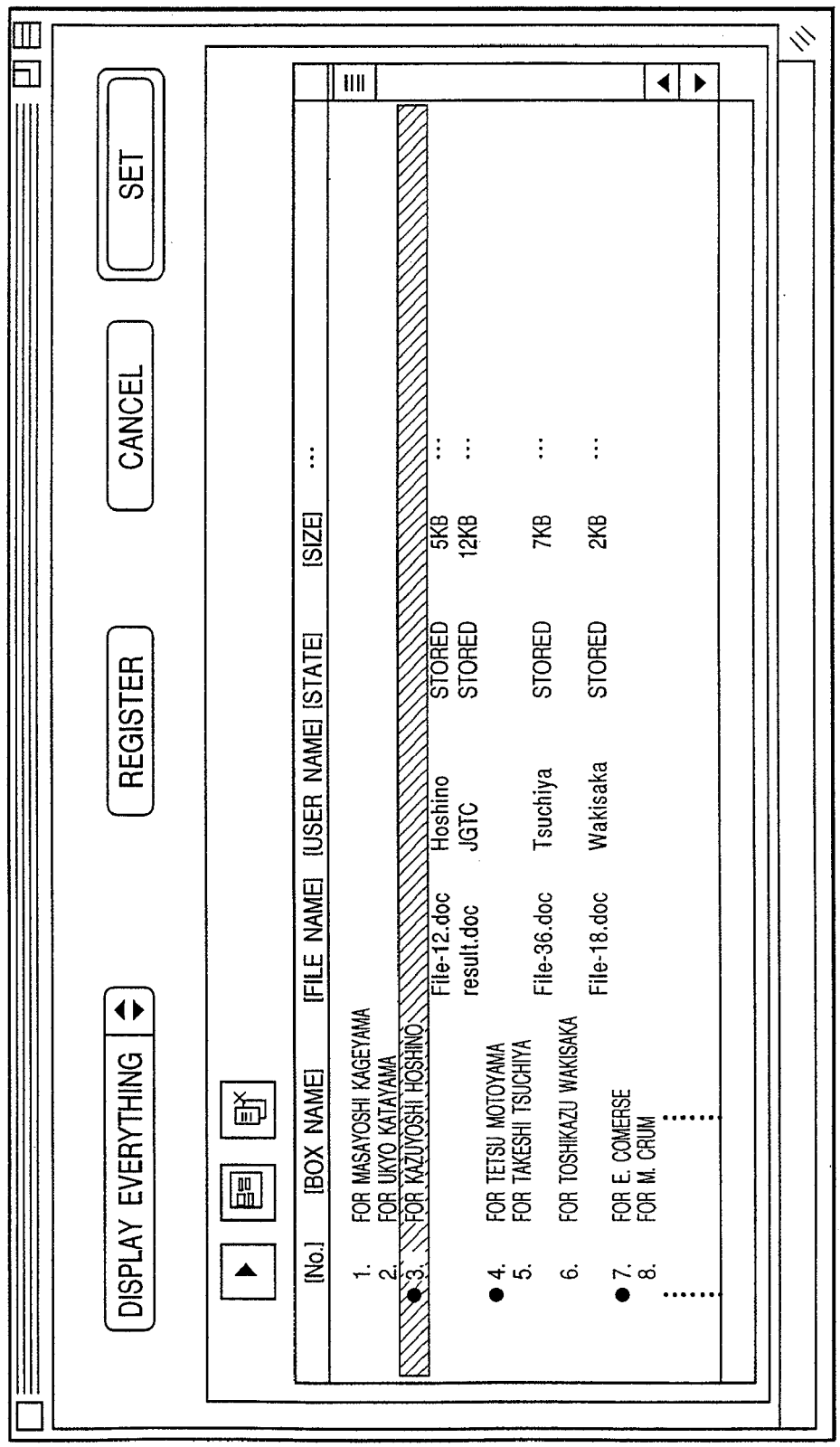
FIG. 16 is a diagram showing an example of a box dialog which is displayed in step S2106 in FIG. 10.
Figure 17:
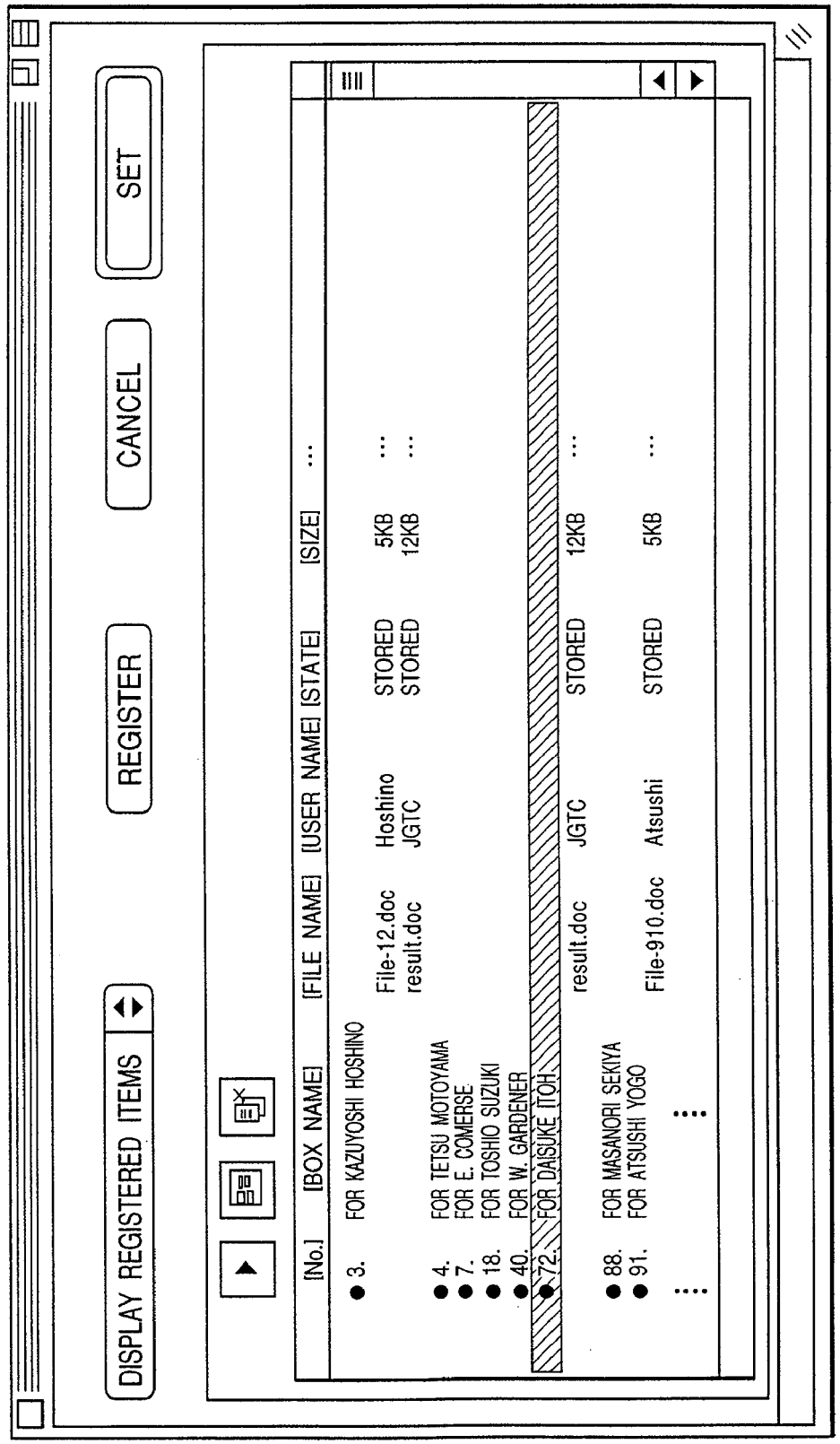
FIG. 17 is a diagram showing an example of a box dialog in a display state of "Display registered items" in step S2113 in FIG. 11.
Figure 19:
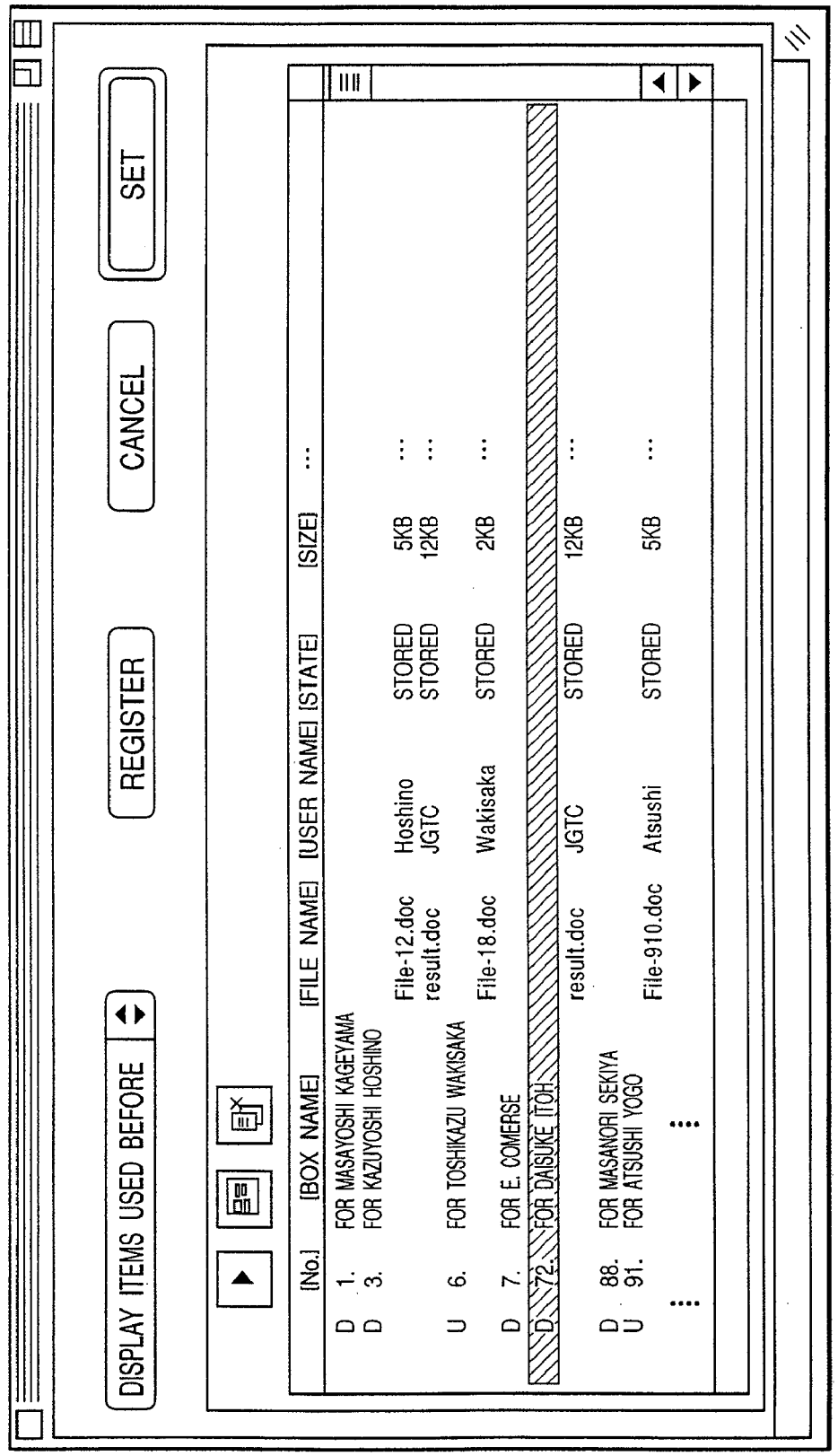
FIG. 19 is a diagram showing an example of a box dialog in a display state of "Display items used before" in step S2115 in FIG. 11.

The printing process which is executed by the printer driver of the host 10 will now be described with reference to FIGS. 8 to 19. FIGS. 8 and 9 are flowcharts showing a procedure for the printing process which is executed by the printer driver which is activated on the host in FIG. 2. FIGS. 10 and 11 are flowcharts showing details of a process in step S2005 in FIG. 8. FIG. 12 is a diagram showing an example of a print dialog which is displayed in step S2001 in FIG. 8. FIG. 13 is a diagram showing an example of a print file information table which is stored in step S2007 in FIG. 8. FIG. 14 is a diagram showing a displaying method menu showing a list of displaying methods which can be set to a box dialog. FIG. 15 is a diagram showing an example of the registration box information table which is held in the server in FIG. 1. FIG. 16 is a diagram showing an example of a box dialog which is displayed in step S2106 in FIG. 10. FIG. 17 is a diagram showing an example of a box dialog in a display state of "Display registered items" in step S2113 in FIG. 11. FIG. 18 is a diagram showing an example of the use box information table which is held in the server in FIG. 1. FIG. 19 is a diagram showing an example of a box dialog in a display state of "Display items used before" in step S2115 in FIG. 11.

When the printer driver is activated on the host 10 by the user, as shown in FIG. 8, first, in step S2001, the print dialog is displayed by the display unit 1040. For example, as shown in FIG. 12, the print dialog is a dialog for setting with respect to various items here. In the example, there are items such as page range, the number of output copies, and job processing method. Further, when "Store into box" is selected as a job processing method, a box dialog which can register the box and select an input destination box of the print job is displayed.

Subsequently, the processing routine advances to step S2002 and whether the setting of the processing method of the job has been changed or not is discriminated. If it is determined here that the setting of the processing method of the job is not changed, step S2206 follows. Whether each item in the print dialog has been set or not is discriminated. If it is determined here that each item in the print dialog has been set, in step S2007, set information of each item in the print dialog is stored as a print file information table into the RAM 1030a in the storing unit 1030. The print file information table has a data structure as shown in, for example, FIG. 13. The number of copies, a paper size, the job processing method, the box number, and the like are described in this table. The processing routine advances to step S2008. On the other hand, if it is determined in step S2006 that an arbitrary item in the print dialog is not set, step S2007 is skipped and step S2008 follows.

In step S2008, whether a "cancel" button has been selected on the print dialog shown in FIG. 12 or not is discriminated. If the "cancel" button has been selected, the print dialog is erased and the processing routine is finished. On the contrary, if the "cancel" button is not selected, in step S2009, whether a "print" button has been selected on the print dialog shown in FIG. 12 or not is discriminated. If the "print" button is not selected, the processing routine is returned to step S2002. On the contrary, if the "print" button has been selected, the processing routine advances to step S2010 shown in FIG. 9.

In step S2002, if it is decided that the setting of the job processing method has been changed, step S2003 follows. Set information of the job processing method is stored as a print file information table (shown in FIG. 13) into the RAM 1030a in the storing unit 1030. Subsequently, step S2004 follows and whether "Store into box" has been selected as a setting of the job processing method or not is discriminated. If "Store into box" is not selected here as a setting of the job processing method, step S2006 follows.

On the contrary, if "Store into box" has been selected as a setting of the job processing method, step S2005 follows. A process such as registration of the box, selection of the input destination box of the print job, or the like is executed.

In the process in step S2005, as shown in FIG. 10, first, in step S2101, information regarding all boxes is obtained from the printer 20. Specifically speaking, a control command to obtain information (box number, box name, storing job information, etc.) regarding all of the boxes stored in the printer 20 is transferred to the control unit 2010 of the printer 20 via the connecting unit 1020 and the connecting unit 2020 of the printer 20. The printer 20 which received the control command returns the information regarding all boxes provided for the disk device 2030c in the storing unit 2030 to the host 10.

Subsequently, step S2102 follows and a box dialog (for example, box dialog shown in FIG. 6) is displayed by the display unit 1040 on the basis of the obtained information regarding the boxes. On the box dialog shown in FIG. 6, selection of a desired box from the displayed boxes, registration thereof, a change of the displaying method, a return from the box dialog to the print dialog, or the like can be executed by an inputting operation from the input unit 1070. As a displaying method here, as shown in FIG. 14, one of "Display everything", "Display registered items", and "Display items used before" can be selected from the display menu and set.

Subsequently, step S2103 follows and whether the setting of the displaying method has been changed or not is discriminated. First, in a state where the box dialog is displayed, since "Display everything" as an initial value has been set as a displaying method, it is determined here that the setting of the displaying method is not changed. Step S2104 follows.

In step S2104, whether a "register" button has been selected in a state where the desired box has been selected on the box dialog or not is discriminated. If the "register" button has been selected, step S2105 follows. Server information such as address, name, and the like of the server which holds the registration box information table is obtained with reference to the box information reference destination table (shown in FIG. 5) stored in the disk device 1030c in the storing unit 1030. The corresponding server is accessed by using the obtained server information. Information of the selected box is held in the registration box information table of this server. As shown in FIG. 15, as information of the selected box, a box number, a box name, registered application information (printer driver (Driver), utility (Utility)), and the like have been described in the registration box information table. Subsequently, step S2106 follows and a mark indicative of the completion of registration is displayed to the box selected on the box dialog. Step S2107 follows. For example, in the box dialog of FIG. 6, if the box number "3" and the box name "for Kazuyoshi Hoshino" have been selected and registered, "●" is added as a mark indicative of the completion of the registration and displayed in the box of the box No. 3 as shown in FIG. 16. The processing routine advances to step S2107.

On the other hand, if it is determined in step S2104 that the "register" button is not selected, steps S2105 and S2106 are skipped and step S2107 follows.

In step S2107, whether a "cancel" button has been selected on the box dialog or not is discriminated. If the "cancel" button has been selected, it is decided that the box dialog is finished. Step S2110 follows and the box dialog is deleted from the display unit 1040. The system exits the present processing routine and the process is returned to step S2006 (shown in FIG. 8).

When the "cancel" button is not selected, step S2108 follows and whether a "set" button has been selected on the box dialog or not is discriminated. If the "set" button is not selected, the processing routine is returned to step S2103. If the "set" button has been selected, step S2109 follows and the number of the selected box is stored into the RAM 1030a in the storing unit 1030. In subsequent step S2110, the box dialog is deleted from the display unit 1040. The system exits the present processing routine and the process is returned to step S2006 (shown in FIG. 8).

If it is determined in step S2103 that the setting of the displaying method has been changed on the box dialog, the processing routine advances to step S2111 shown in FIG. 11. Whether the displaying method has been changed to "Display everything" as an initial value in the display menu or not is discriminated. If the setting of the displaying method has been changed to "Display everything", step S2112 follows. In a manner similar to step S2101, information (box number, box name, storing job information, etc.) regarding all of the boxes is obtained from the printer 20. In subsequent step S2117, the box information in the box dialog is updated to the box information obtained from the printer 20. Step S2107 follows.

If the displaying method is not changed to "Display everything" in step S2111, step S2113 follows and whether the displaying method has been changed to "Display registered items" in the box dialog or not is discriminated. If the displaying method has been changed to "Display registered items", step S2114 follows. In step S2114, the server 30 which holds the registration box information table is accessed with reference to the box information reference destination table stored in the disk device 1030c in the storing unit 1030. Information in the registration box information table (shown in FIG. 15) held in the server 30 is obtained.

Subsequently, step S2117 follows and the box information in the box dialog is updated by using the information obtained from the server. For example, as shown in FIG. 17, a form such that only the boxes added with the mark "●" showing that the user has previously registered the box on the basis of the registration box information table are displayed in the box dialog is derived. The processing routine advances to step S2107.

If it is determined in step S2113 that the displaying method is not changed to "Display registered items", step S2115 follows. Whether the displaying method has been changed to "Display items used before" or not is discriminated. If the displaying method has been changed to "Display items used before", step S2116 follows. The server 30 which holds the use box information table is accessed with reference to the box information reference destination table stored in the disk device 1030*c* in the storing unit 1030. Information in a use box information table (shown in FIG. 18) held in the server 30 is obtained. For example, as shown in FIG. 18, the information (box number, box name, use application, etc.) of the boxes used by the user before has been described in the use box information table held in the server 30. Subsequently, step S 2117 follows and the box information in the box dialog is updated by using the information obtained from the server 30. For example, as shown in FIG. 19, the system enters a display form such that only the boxes added with the marks each showing that the user used those boxes before are displayed in the box dialog on the basis of the use box information table. As for the mark added to each of the displayed boxes, a mark "D" is added to the box used from the printer driver and a mark "U" is added to the box used from the utility. The processing routine advances to step S2107.

If it is determined in step S2115 that the displaying method is not changed to "Display items used before", step S2107 follows.

If it is determined in step S2009 shown in FIG. 8 that the "print" button has been selected, a printing process is started in step S2010 shown in FIG. 9. In subsequent step S2011, print data is formed and stored into the disk device 1030*c* in the storing unit 1030. Step S2012 follows and whether the box information indicative of the input destination of the print job has been stored or not is discriminated by referring to a print file information table (shown in FIG. 13) stored in the RAM 1030*a* in the storing unit 1030. If the box information indicative of the input destination of the print job has been stored, step S2013 follows, an attribute of the job is set into the storing job, the number of the box serving as an input destination of the print job is added to the print data, and step S2014 follows. On the contrary, if the box information indicative of the input destination of the print job is not stored, the processing routine is skipped to step S2013 and advances to step S2014.

In step S2014, the print data is transmitted to the printer 20. In subsequent step S2015, the server 30 which holds the use box information table (shown in FIG. 18) is accessed with reference to the box information reference destination table (shown in FIG. 5) stored in the disk device 1030*c* in the storing unit 1030. The information of the used boxes is stored into the use box information table (shown in FIG. 18). The present processing routine is finished.

Figure 20:
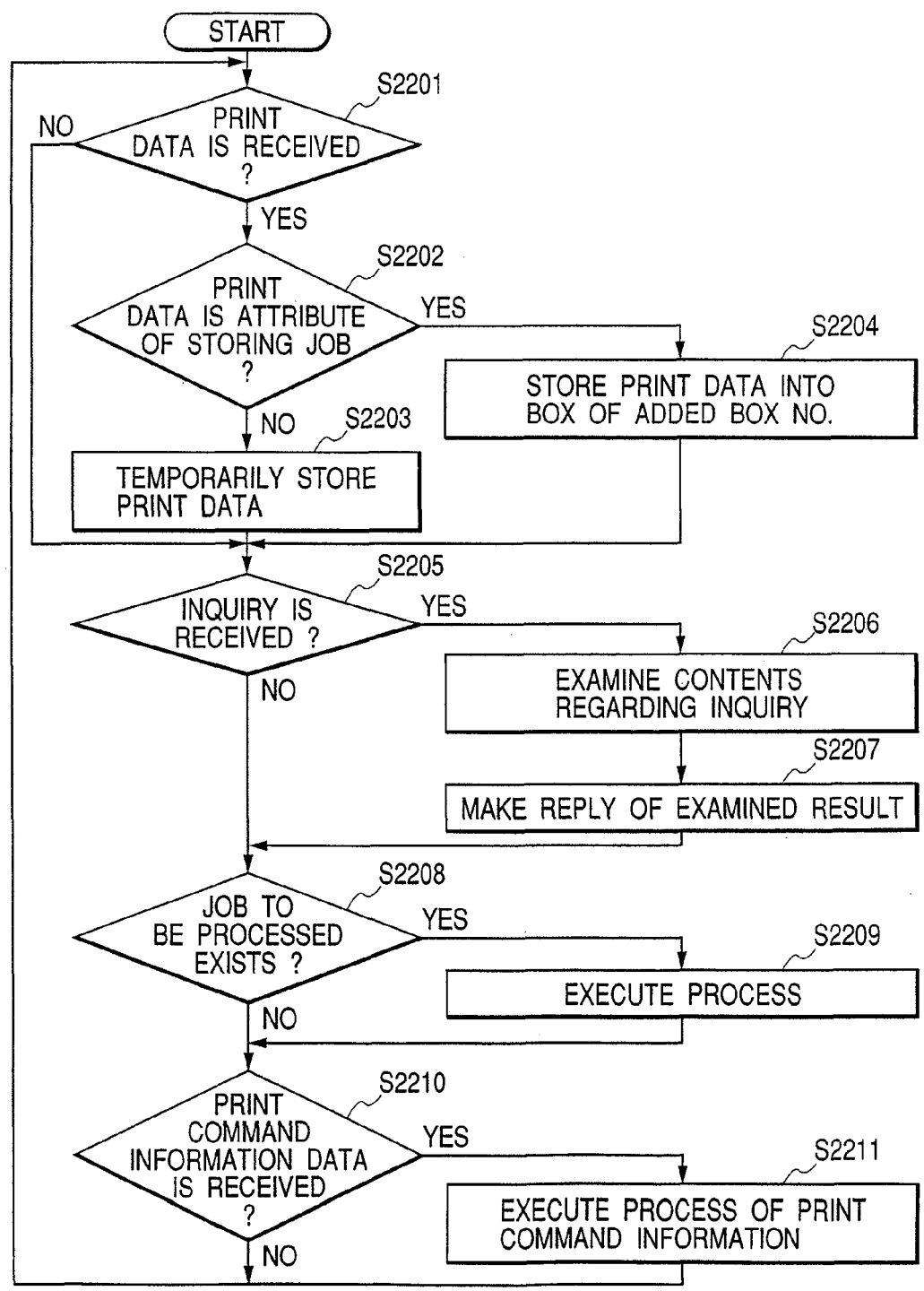
FIG. 20 is a flowchart showing a processing procedure of a printer in FIG. 2.

The process of the printer 20 will now be described with reference to FIG. 20. FIG. 20 is a flowchart showing a processing procedure of the printer in FIG. 2. The procedure shown by the flowchart is executed by the control unit 2010 in the printer 20.

In the printer 20, as shown in FIG. 20, whether the print data has been received or not is discriminated. If the print data is not received, step S2205 follows and whether an inquiry (step S2101 in FIG. 10 or step S2112 in FIG. 11) from the host 10 has been received or not is discriminated. If the inquiry from the host 10 has been received, step S2206 follows and contents regarding the received inquiry are examined. It is now assumed that the received inquiry is a control command of a request for obtaining the box information. Subsequently, step S2207 follows and the box information stored in the disk device 2030*c* in the storing unit 2030 is returned to the host 10 as a result regarding the inquiry. Step S2208 follows. On the contrary, if the inquiry is not received, steps S2206 and S2207 are skipped and step S2208 follows.

In step S2208, whether a job to be processed exists in the storing unit 2030 or not is discriminated. If the job to be processed exists in the storing unit 2030, step S2209 follows and a process is executed. The processing routine advances to step S2210. On the other hand, if the job to be processed does not exist, step S2209 is skipped and step S2210 follows.

In step S2210, whether print command information data has been received or not is discriminated. If the print command information data has been received, step S2211 follows and the corresponding process is executed on the basis of the print command information data. The processing routine is returned to step S2201. On the other hand, if the print command information data is not received, step S2211 is skipped and the processing routine is returned to step S2201. The print command information data is data which is received from the utility that is activated on the host 10. This information will be explained in detail hereinlater.

If it is decided in step S2201 that the print data has been received, step S2202 follows. The received print data is analyzed and whether the attribute of the storing job has been set or not is discriminated. If the attribute of the storing job is not set in the received print data here, step S2203 follows. The print data is temporarily stored into the disk device 2030*c* in the storing unit 2030 and step S2205 follows. On the other hand, if the attribute of the storing job has been set in the received print data, step S2204 follows. The print data is stored into the box of the added box number and step S2205 follows.

A specific example of the process which is executed by the printer driver will now be described.

First, in the case where the box in which a box number is set to "3" and a box name is set to "For Kazuyoshi Hoshino" among the boxes held in the printer 20 is registered from the host 10, first, "Store into box" is selected in a print dialog shown in FIG. 12 (step S2004). When "Store into box" is selected, all box information is obtained from the printer 20 and the box dialog shown in FIG. 6 is displayed (step S2005). Since the displaying method is set to the state where "Display everything" as an initial value has been selected, it is determined that the setting of the displaying method is not changed (step S2103).

In the box dialog, if the box of the box No. "3" is selected and the "register" button is selected (step S2104), the server 30 which holds the registration box information table (shown in FIG. 15) is recognized with reference to the box information reference destination table (shown in FIG. 5) stored in the disk device 1030*c* in the storing unit 1030. The server 30 is accessed and the information (box No. "3", box name "For Kazuyoshi Hoshino", information "Driver" showing that the application used for registration is the printer driver, etc.) of the selected box is stored into the registration box information table (step S2105). As shown in FIG. 16, the mark "●" indicative of the completion of the registration is displayed for the box of No. 3 in the box dialog (step S2106). Thus, the box in which a box number is set to "3" and a box name is set to "For Kazuyoshi Hoshino" is registered. When the "cancel" button is selected in the box dialog, the screen is returned to the print dialog. When the "cancel" button is selected in the print dialog, the print dialog is finished.

As shown in FIG. 16, with respect to each box in which a box number is set to "4", a box name is set to "For Tetsu Motoyama", a box number is set to "7", and a box name is set to "For E. Comerse", by repeating processes similar to those mentioned above, each box can be registered. At least one or more boxes in which a repetitive use frequency is high can be previously registered.

Subsequently, a case of storing a print file (job) "File-abc.doc" into a box which has already been registered by the user and in which a box number is set to "72" and a box name is set to "For Daisuke Itoh" will be explained. First, "Store into box" is selected in the print dialog shown in FIG. 12 (step S2004). When "Store into box" is selected, all of the box information is obtained from the printer 20 and the box dialog shown in FIG. 6 is displayed (step S2005). Here, in the box dialog, the displaying method is changed from "Display everything" to "Display registered items" (step S2113). The location of the server 30 which holds the registration box information table is recognized with reference to the box information reference destination table (shown in FIG. 5) stored in the disk device 1030c in the storing unit 1030, the server 30 is accessed, and the information of the registration box information table is obtained (step S2114). The box information in the box dialog is updated by using the information obtained from the server 30 and displayed by the display unit 1040 (step S2117). Thus, the box dialog in which only the boxes (added with the mark "●" showing that the box has previously been registered) which have previously been registered and are shown in FIG. 17 are displayed is obtained.

By the series of processes, searching performance of the box which is used is improved. For example, hitherto, in case of designating the box of a large box number such as a box which has been used before and in which a box number is set to "72" and a box name is set to "For Daisuke Itoh", it is necessary to scroll a display area of the box information in the box dialog several times. In the embodiment, however, since only the boxes which have previously been registered can be displayed in the box dialog, a registration box serving as an input destination of the print job can be easily found and designated.

When the box serving as an input destination of the print job is designated on the box dialog which is shown in FIG. 17 and in which only the boxes (added with the mark "●" showing that the box has previously been registered) have previously been registered have been displayed and the "print" button is selected (step S2009), the print data is formed (step S2011), the attribute of the job is set to the storing job, and the box number of the box serving as an input destination of the print job is added to the print data (step S2013). The print data added with the box number is transmitted (step S2014). The server 30 is accessed and information of the used box is stored into the use box information table (shown in FIG. 18) (step S2015).

In the printer 20, when the print data added with the box number is received (step S2201), the received print data is analyzed (step S2202). Since the attribute of the storing job has been set into the received print data here, the print data is stored in the box of the added box number (step S2204).

A case where the print job is processed by the printer 20 without storing it into the box will now be described.

In this case, on the printer dialog of the host 10, "Store into box" is not selected. Therefore, the box dialog is not opened, but after various items are set on the print dialog, the "print" button is selected (step S2009). The print data is formed (step S2011). The print data is transmitted to the printer 20 without adding the box number of the box on the storing destination side to it (step S2014).

In the printer 20, when the print data is received (step S2201), the received print data is analyzed (step S2202). Since the attribute of the storing job is not set into the received print data here, the received print data is temporarily stored (step S2203). The received print data is processed (step S2209).

Figure 21:
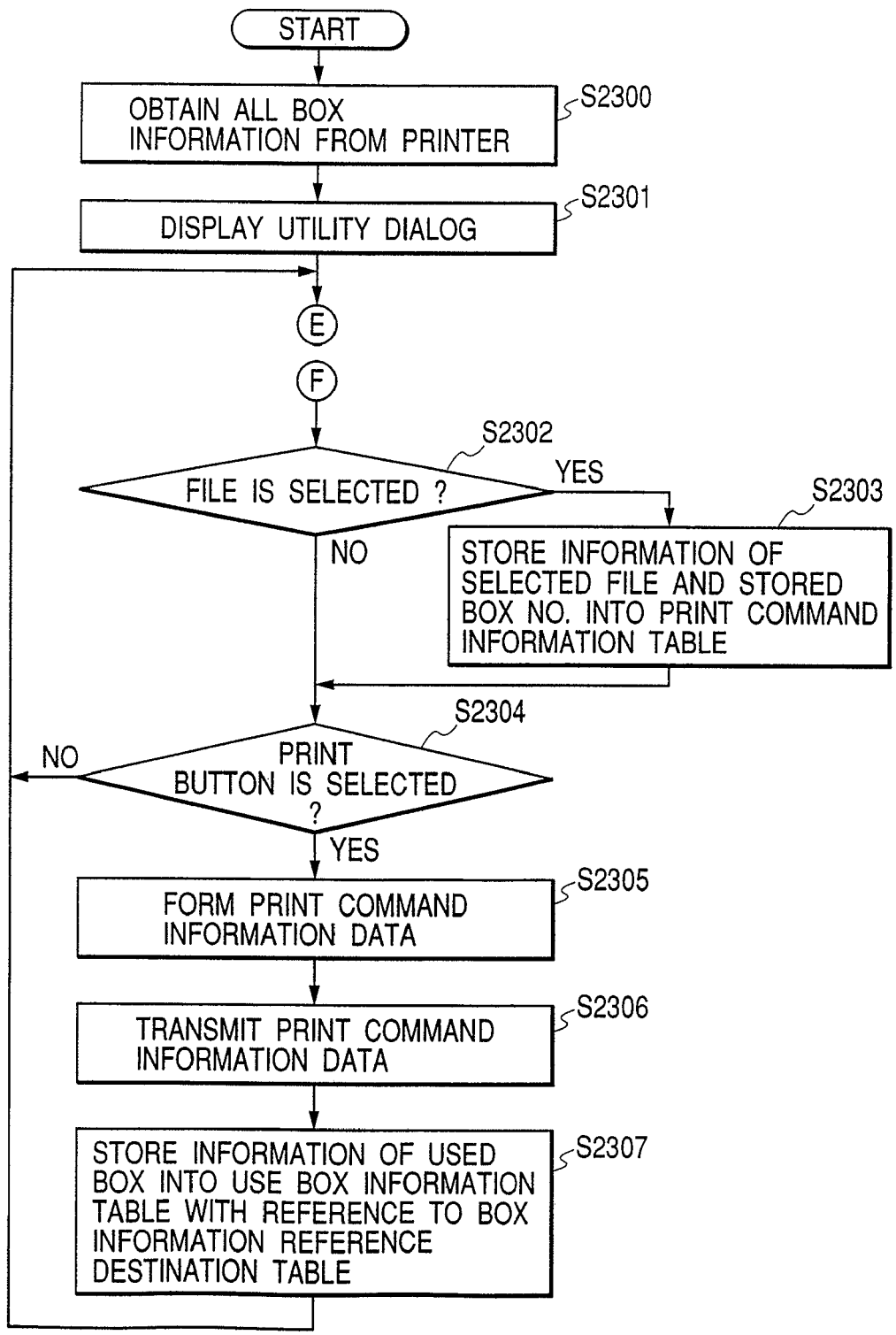
FIG. 21 is a flowchart showing a processing procedure in the case where a print job is searched and executed by a utility activated on the host in FIG. 2.
Figure 22:
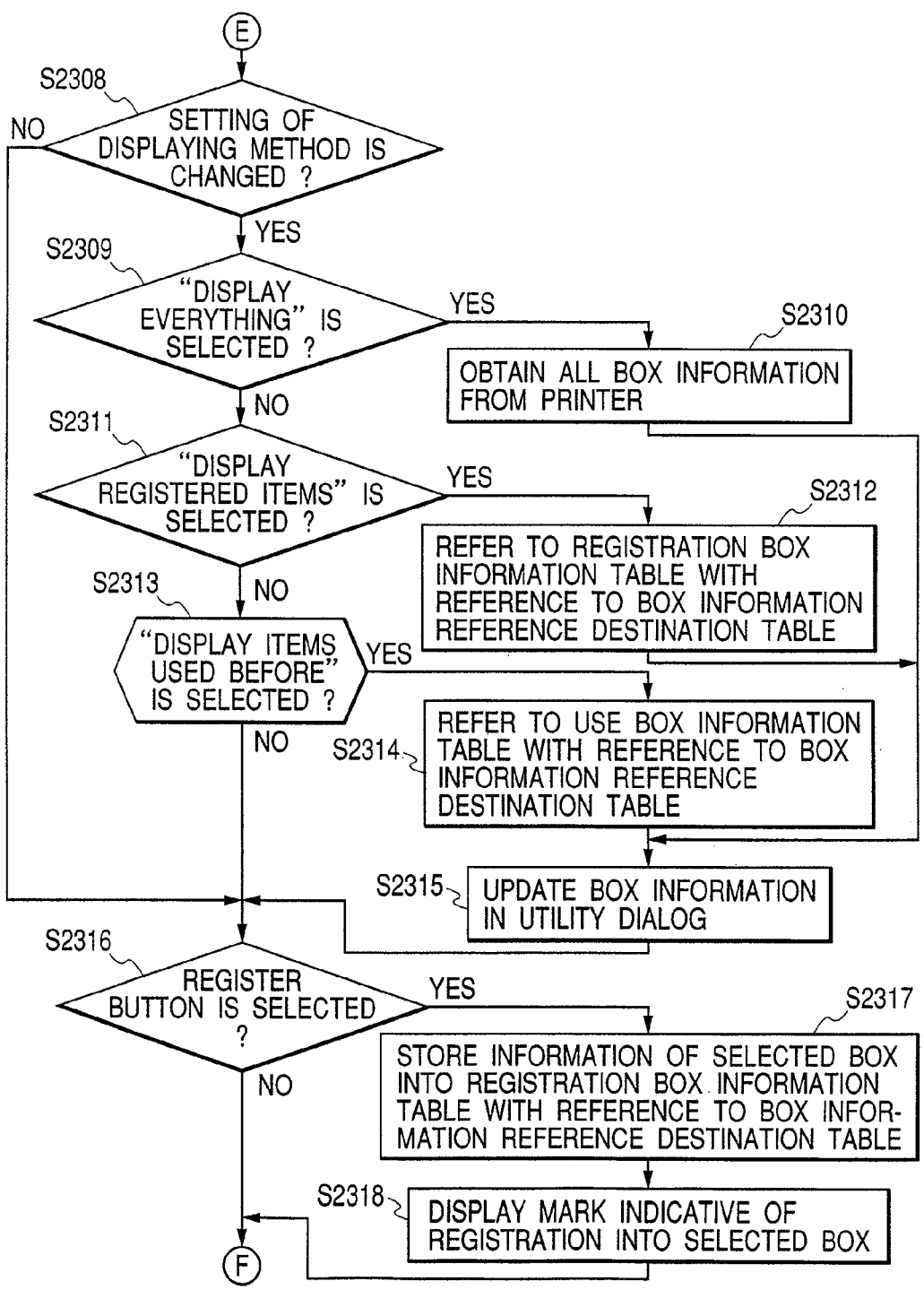
FIG. 22 is a flowchart showing the processing procedure in the case where the print job is searched and executed by the utility activated on the host in FIG. 2.
Figure 23:
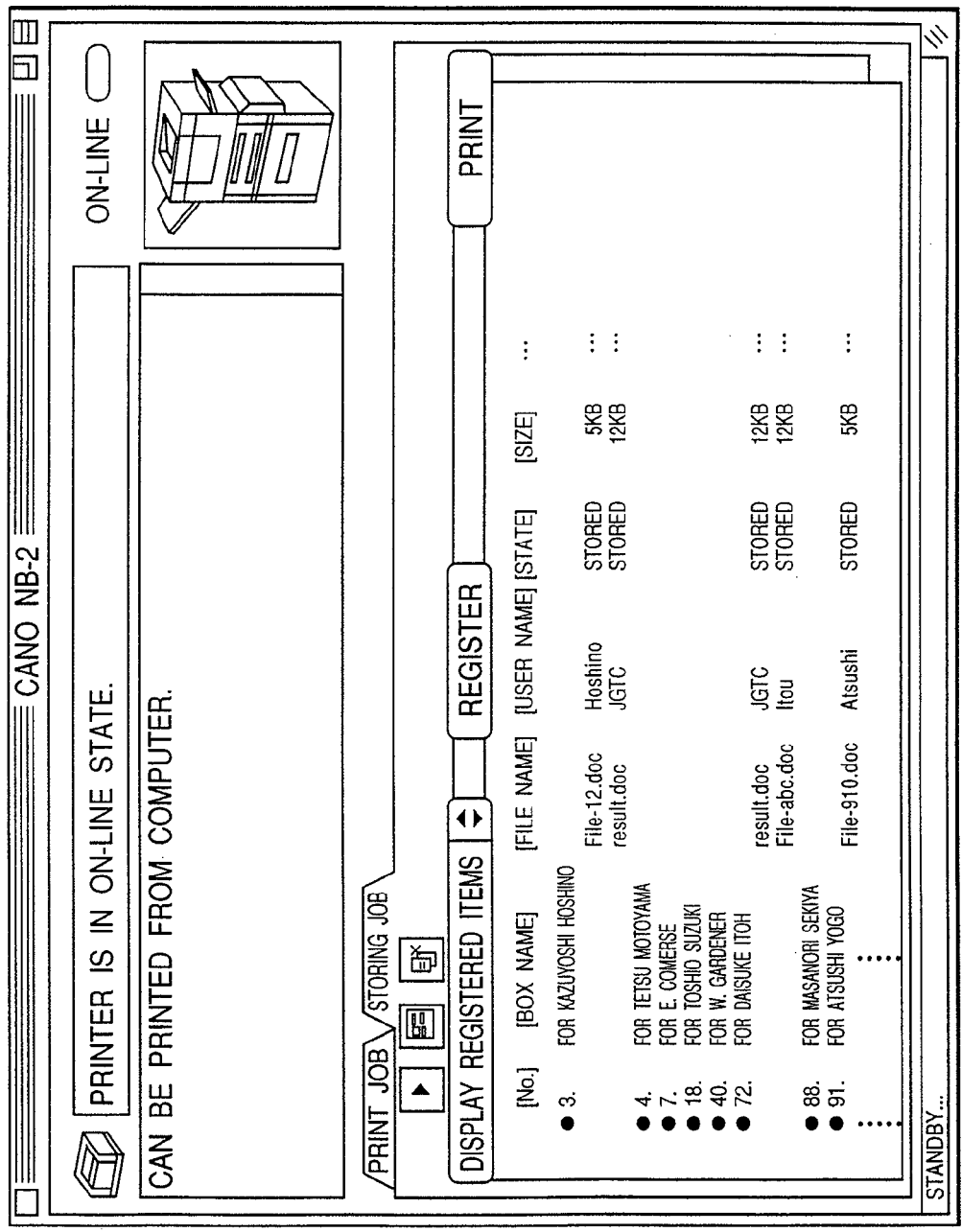
FIG. 23 is a diagram showing an example of a utility dialog in a state where "Display registered items" is selected as a displaying method.
Figure 24:
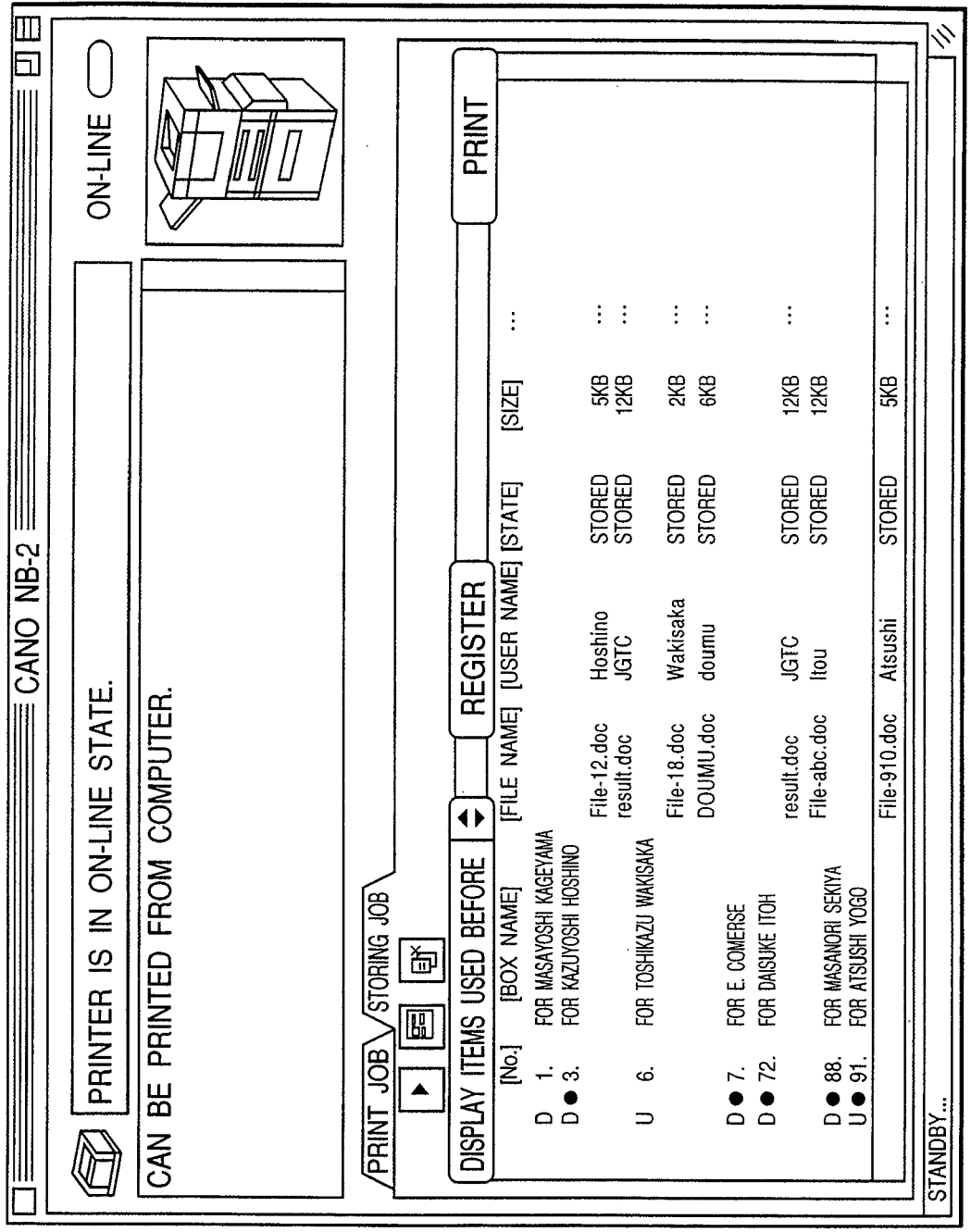
FIG. 24 is a diagram showing an example of a utility dialog in a state where "Display items used before" is selected as a displaying method.
Figures 25, 26:
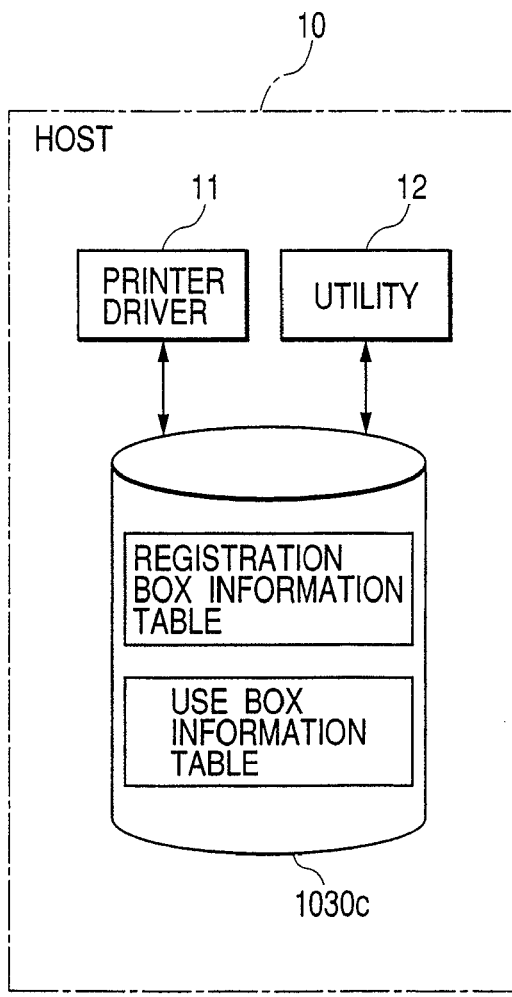
FIG. 25 is a diagram showing an example of a print command information table in step S2303 in FIG. 21.
FIG. 26 is a diagram schematically showing a holding state of each table in the case where the registration box information table and the use box information table are held in the host.

In the embodiment, the utility is activated on the host 10 and the print job stored in the box of the printer 20 can be searched and executed from the utility. Processes in this case will now be described with reference to FIGS. 21 to 25. FIGS. 21 and 22 are flowcharts showing a processing procedure in case of searching the print job by the utility activated on the host in FIG. 2 and executing it. FIG. 23 is a diagram showing an example of a utility dialog in a state where "Display registered items" has been selected as a displaying method. FIG. 24 is a diagram showing an example of a utility dialog in a state where "Display items used before" has been selected as a displaying method. FIG. 25 is a diagram showing an example of a print command information table in step S2303 in FIG. 21. When the utility is activated on the host 10, as shown in FIG. 21, first, in step S2300, information regarding all of the boxes is obtained from the printer 20 (box number, box name, storing job information, etc.) in a manner similar to the procedure in case of the printer driver. In subsequent step S2301, the utility dialog is displayed by the display unit 1040. The utility dialog is a dialog having a structure as shown in, for example, FIG. 23. On this utility dialog, in a manner similar to the box dialog, selection of a file to be printed from the displayed boxes, a change of the displaying method, or the like can be executed by the inputting operation from the input unit 1070. In a manner similar to the case of the printer driver, one of "Display everything", "Display registered items", and "Display items used before" can be selected as a displaying method from the display menu and set (refer to FIG. 14). The utility diagram shown in FIG. 23 is a dialog in a state where "Display registered items" has been selected as a displaying method as will be explained hereinlater. With respect to the box information displayed in this utility dialog, it differs from the utility dialog displayed in step S2301. Subsequently, the processing routine advances o step S2308 shown in FIG. 22 and whether the setting of the displaying method has been changed or not is discriminated. In a state where a utility box has been displayed first, since "Display everything" as an initial value has been set as a displaying method, it is determined here that the setting of the displaying method is not changed. Step S2316 follows. In step S2316, whether the "register" button has been selected in a state where a desired box had been selected on the utility dialog or not is discriminated. If the "register" button has been selected, step S2317 follows. The server 30 which holds the registration box information table (shown in FIG. 15) is accessed with reference to the box information reference destination table (shown in FIG. 5) stored in the disk device 1030c in the storing unit 1030. The information of the selected box is stored into the registration box information table of the server 30. Thus, even in case of referring the registration box information table from the printer driver, the information of the box registered by the utility can be referred to. That is, the registration box information table can be shared between the software in which the printer drivers and the utilities are different, respectively. Subsequently, step S2318 follows, the mark "●" indicative of the completion of the registration is displayed to the box selected on the utility dialog. The processing routine advances to step S2302 shown in FIG. 21.

On the other hand, if it is determined in step S2316 that the "register" button is not selected, steps S2317 and S2318 are skipped and the processing routine advances to step S2302 shown in FIG. 21.

If it is determined in step S2308 that the setting of the displaying method has been changed on the utility dialog, step S2309 follows. Whether the displaying method has been changed to "Display everything" as an initial value in the display menu or not is discriminated. If the setting of the displaying method has been changed to "Display everything", step S2310 follows. In a manner similar to step S2300, the information (box number, box name, storing job information, etc.) regarding all of the boxes is obtained from the printer 20. In subsequent step S2315, the box information in the utility dialog is updated to the box information obtained from the printer 20. Step S2316 follows.

If it is decided in step S2309 that the displaying method is not changed to "Display everything", step S2311 follows. Whether the displaying method has been changed to "Display registered items" on the utility dialog or not is discriminated. If the displaying method has been changed to "Display registered items", step S2312 follows. In step S2312, the server 30 which holds the registration box information table is accessed with reference to the box information reference destination table stored in the disk device 1030c in the storing unit 1030. The information in the registration box information table (shown in FIG. 15) held in the server 30 is obtained, and step S2315 follows. The box information in the utility dialog is updated by using the information obtained from the server 30. For example, as shown in FIG. 23, the system enters a form such that only the boxes added with the mark "●" showing that the user has previously registered the box are displayed in the box dialog on the basis of the registration box information table, and step S2316 follows.

If it is decided in step S2311 that the displaying method is not changed to "Display registered items", step S2313 follows. Whether the displaying method has been changed to "Display items used before" or not is discriminated. If the displaying method has been changed to "Display items used before" here, step S2314 follows. The server 30 which holds the use box information table is accessed with reference to the box information reference destination table stored in the disk device 1030c in the storing unit 1030. The information in the use box information table (shown in FIG. 18) held in the server 30 is obtained, and step S2315 follows. The box information in the utility dialog is updated by using the information obtained from the server 30. For example, as shown in FIG. 24, the system enters a form such that only the boxes added with the mark showing that the user has previously used the box are displayed in the box dialog on the basis of the use box information table. As for the mark added to each of the displayed boxes, the mark "D" is added to the box used from the printer driver and the mark "U" is added to the box used from the utility. The processing routine advances to step S2316.

If it is determined in step S2313 that the displaying method is not changed to "Display items used before", step S2316 follows.

In step S2302, whether the file has been selected by the series of processes in steps S2308 to S2318 or not is discriminated. If the file has been selected, step S2303 follows. The information of the selected file and the stored box number are stored as a print command information table into the RAM 1030a in the storing unit 1030. As shown in FIG. 25, a box number, a file name, a print end notification destination (host 10, here), the number of output copies, and the like are described in the print command information table, and step S2304 follows. On the other hand, if the file is not selected, step S2303 is skipped and step S2304 follows.

In step S2304, whether the "print" button has been selected on the utility dialog or not is discriminated. If the "print" button has been selected, step S2305 follows and print command information data which can be interpreted by the printer 20 is formed on the basis of the print command information table. Subsequently, step S2306 follows and the formed print command information data is transmitted to the printer 20. Subsequently, step S2307 follows and the server 30 which holds the use box information table is accessed with reference to the box information reference destination table (shown in FIG. 5) stored in the disk device 1030c in the storing unit 1030. The information of the used box is stored into the use box information table (shown in FIG. 18). The processing routine is returned to step S2308.

As mentioned above, even in the utility, in a manner similar to the printer driver, the print job to be processed can be easily searched and the searching performance can be improved.

In the printer 20, when the print command information data transmitted from the utility is received (step S2210), contents of the print command information data are analyzed, the file to be printed is specified, and printing is performed (step S2211). For example, when the print command information data of contents shown in FIG. 25 is received, a print job "File-910.doc" is read out from the box in which a box number is set to "91" and a box name is set to "For Atsushi Yogo" and ten copies are printed in response to the print job "File-910.doc".

In the embodiment, the information regarding the box is shared between the software in which the printer drivers and the utilities are different, respectively, and functionally interlocked, so that the searching performance and the operability in case of using the box of the printer 20 can be fairly improved.

Although the case of using the box of the printer 20 from the host 10 has been described in the embodiment, for example, a box of the printer 50 (shown in FIG. 1) can be also used from the host 10. Also in this case, the box to which the print job is inputted and the print job inputted to the box of the printer 50 can be also designated from the host 10 by a procedure similar to that mentioned above.

Figures 27, 28:
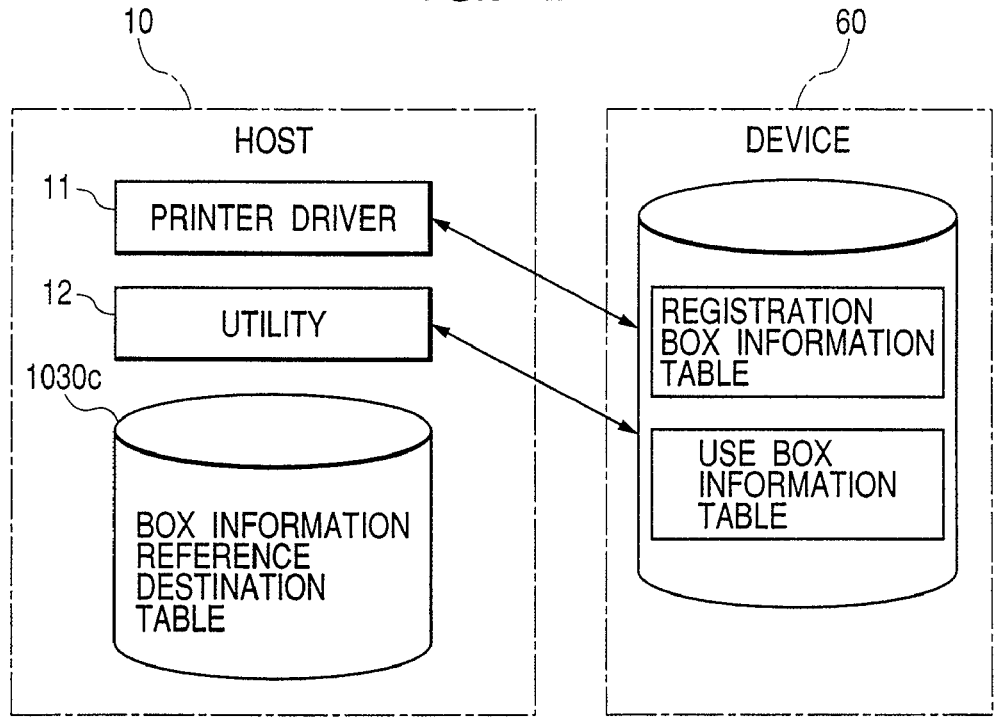
FIG. 27 is a diagram schematically showing a holding state of each table in the case where the registration box information table and the use box information table are held in a device.
FIG. 28 is a diagram showing another example of a display menu for selecting a displaying method of the box information in the box dialog and utility dialog.

Although the case where the server 30 holds the registration box information table and the use box information table has been shown in the embodiment, in place of such an example, as shown in FIG. 26, the registration box information table and the use box information table can be also stored into the disk device 1030c so that they can be referred to from the printer driver 11 and utility 12. Such a construction is effective particularly in the case where the host 10 and printer 20 are connected in a one-to-one correspondence relational manner. As shown in FIG. 27, it is also possible to construct so as to store the registration box information table and the use box information table into a device which can be accessed from the printer driver 11 and utility 12. In this case, information such as address of the device, storing location of each table, and the like is stored into the box information reference destination table. The above device is, for example, a hard disk drive or the like provided in the outside of the host 10.

In the embodiment, one of "Display everything", "Display registered items", and "Display items used before" can be selected as a displaying method of the box information in the box dialog and the utility dialog. However, in place of such a method, the displaying method of the box information can be also controlled in accordance with conditions selected from conditions as shown in FIG. 28. Also in this case, effects similar to those mentioned above can be expected.

With respect to the printers 20 and 50, its printing system is not limited. For example, a printer of an electrophotographic system, an ink jet system, a thermal transfer system, or the like can be used. The invention is not limited to the printers 20 and 50 but can be also applied to an apparatus having a printing function such as copying apparatus, facsimile apparatus, plotter, or the like.

The object of the invention can be also accomplished by a method whereby a memory medium in which program codes of software to realize the functions of the embodiment mentioned above (including the flowcharts shown in FIGS. 8 to 11 and FIGS. 20 to 22) have been stored is supplied to a system or an apparatus, and a computer (a CPU or an MPU) of the system or apparatus reads out and executes the program codes stored in the memory medium.

In this case, the program codes themselves read out from the memory medium realize the functions of the embodiment mentioned above, and the memory medium in which the program codes have been stored constructs the invention.

As a memory medium for supplying the program codes, for example, a floppy (registered trademark) disk, a hard disk, an optical disk, a magnetooptic disk, a CD-ROM, a CD-R, a DVD-ROM, a magnetic tape, a non-volatile memory card, an ROM, or the like can be used.

As many apparently widely different embodiment of the present invention can be made without departing from the spirit and scope thereof, it is to be understood that the invention is not limited to the specific embodiment thereof except as defined in the appended claims.

As described above, according to the invention, on the box designation picture plane for designating the box serving as an input destination of the print job, the box to be registered is designated in accordance with the registration designating operation of the user. The box information regarding the designated box is stored into the registration box information storing means. The box information regarding the registered box is obtained from the registration box information storing means. A list of only the box information regarding the registered boxes is displayed on the box designation picture plane. Therefore, the searching performance and the operability in case of using the box of the printing apparatus can be improved.

According to the invention, on the print job designation picture plane for designating the print job to be processed from the print jobs inputted respectively to a plurality of boxes, the box to be registered is designated in accordance with the registration designating operation of the user. The print job information regarding the designated box and the print job inputted thereto is stored into the registration box information storing means. The print job information regarding the print job inputted to the registered box is obtained from the registration box information storing means. A list of only the print job information of the registered boxes is displayed on the print job designation picture plane. Therefore, the searching performance and the operability in case of using the box of the printing apparatus can be improved.

According to the invention, the printing apparatus comprises: the print job storing means for, when the print job added with the box information which can specify the box on the input destination side is received from the information processing apparatus, specifying the box serving as an input destination of the received print job on the basis of the box information and storing the received print job into the specified box; the processing means for, when the print job and the print command information which can specify the box on the input destination side of the print job are received from the information processing apparatus, reading out the corresponding print job from the corresponding box on the basis of the received print command information and processing it; and the transmitting means for, when an information obtaining request is received from the information processing apparatus, transmitting the information according to the information obtaining request to the information processing apparatus. Therefore, the printing apparatus in which the searching performance and the operability in case of using the box can be improved can be provided.

What is claimed is:

1. An information processing apparatus provided with a printer driver which generates print data sent to a printing apparatus having a first and second boxes to store the print data, said information processing apparatus comprising:
   an obtaining unit constructed to obtain from the printing apparatus a name of first print data stored in the first box and a name of second print data stored in the second box;
   a display control unit constructed to display a box dialog which indicates that the first print data is stored in the first box and the second print data is stored in the second box, based on the names of the first and second print data obtained by said obtaining unit, wherein the box dialog is provided by the printer driver; and
   a designating unit constructed to designate an input destination of new print data in accordance with a designation received via the box dialog displayed by said display control unit.

2. An information processing apparatus according to claim 1, further comprising a use box registering unit constructed register the first box as a box to be displayed on the box dialog, wherein, when a mode is designated for displaying information on the box registered by said registering unit, said display control unit displays the box dialog including the name of the first print data stored in the first box but not including the name of the second print data stored in the second box, and when a mode is designated for displaying information on all the boxes, said display control unit displays the box dialog indicating that the first print data is stored in the first box and the second print data is stored in the second box.

3. An information processing apparatus according to claim 1, wherein when a mode is designated for displaying a box used previously and when the printing apparatus has a third box not used to store print data, said display control unit displays the box dialog indicating that the first print data is stored in the first box and the second print data is stored in the second box, without displaying information on the third box.

4. An information processing method which is executed by an information processing apparatus which can provide a printer driver which generates print data sent to a printing apparatus having first and second boxes to store the print data, the method comprising:
   an obtaining step of obtaining from the printing apparatus a name of first print data stored in the first box and a name of second print data stored in the second box;
   a display control step of displaying a box dialog which indicates that the first print data is stored in the first box and the second print data is stored in the second box, based on the names of the first and second print data obtained by said obtaining step, wherein the box dialog is provided by the printer driver; and
   a designating step of designating an input destination of new print data in accordance with a designation received via the box dialog displayed in said display control step.

5. A method according to claim 4, further comprising a registering step to register the first box as a box to be displayed on the box dialog, wherein, when a mode is designated for displaying information on the box registered by said registering step, said display control step displays the box dialog including the name of the first print data stored in the first box but not including the name of the second print data stored in the second box, and when a mode is designated for displaying information on all the boxes, said display control step displays the box dialog indicating that the first print data is stored in the first box and the second print data is stored in the second box.

6. A method according to claim 5, wherein, when a mode is designated for displaying a box used previously and when the printing apparatus has a third box not used to store print data, said display control step displays the box dialog indicating that the first print data is stored in the first box and the second print data is stored in the second box, without displaying information on the third box.

7. A computer-executable program, stored on a non-transitory computer-readable medium, which can be executed by an information processing apparatus for providing a printer driver which generates print data sent to a printing apparatus having first and second boxes to store the print data, said program comprising:

an obtaining module for obtaining from the printing apparatus a name of first print data stored in the first box and a name of second print data stored in the second box;

a display control module for displaying a box dialog which indicates that the first print data is stored in the first box and the second print data is stored in the second box, based on the names of the first and second print data obtained by said obtaining module, wherein the box dialog is provided by the printer driver; and a designating module for designating an input destination of new print data in accordance with a designation received via the box dialog displayed by said display control module.

* * * * *